(12) United States Patent
Pardon

(10) Patent No.: US 10,942,823 B2
(45) Date of Patent: Mar. 9, 2021

(54) TRANSACTION PROCESSING SYSTEM, RECOVERY SUBSYSTEM AND METHOD FOR OPERATING A RECOVERY SUBSYSTEM

(71) Applicant: Guy Pardon, Mechelen (BE)

(72) Inventor: Guy Pardon, Mechelen (BE)

(*) Notice: Subject to any disclaimer, the term of this patent is extended or adjusted under 35 U.S.C. 154(b) by 238 days.

(21) Appl. No.: 16/255,726

(22) Filed: Jan. 23, 2019

(65) Prior Publication Data

US 2019/0235974 A1 Aug. 1, 2019

Related U.S. Application Data

(60) Provisional application No. 62/623,111, filed on Jan. 29, 2018.

(51) Int. Cl.
*G06F 11/07* (2006.01)
*G06F 11/14* (2006.01)
(Continued)

(52) U.S. Cl.
CPC ........ *G06F 11/1474* (2013.01); *G06F 16/252* (2019.01); *G06F 16/283* (2019.01); *G06F 2201/80* (2013.01)

(58) Field of Classification Search
CPC .................................................. G06F 11/1474
(Continued)

(56) References Cited

U.S. PATENT DOCUMENTS 5,193,188 A 3/1993 Franaszek
5,287,501 A 2/1994 Lomet
(Continued)

FOREIGN PATENT DOCUMENTS

EP 0457109 5/1991
EP 0805394 4/1997
WO WO 1999/046674 9/1999

OTHER PUBLICATIONS

Software release notes Extreme Transactions 4.0.52, Jan. 31, 2017. The functionality of the invention was published in the form of this software release.
(Continued)

*Primary Examiner* — Chae M Ko
(74) *Attorney, Agent, or Firm* — Oppedahl Patent Law Firm LLC

(57) ABSTRACT

A transaction processing system comprises a transaction processing (TP) subsystem (11) executed on a TP server (21), a recovery subsystem (13), executed on a recovery server (23) and one or more resource subsystems (12) executed on one or more resource servers (22). The TP subsystems (11) are configured to access the one or more resource subsystems (12), wherein the TP server (21) is not the same server as the recovery server (23), and
  wherein the recovery subsystem (13) itself, or a DBMS log that the recovery subsystem is configured to read from and to write to, is configured to clean up pending transactions created in the transaction processing system, in the event of failures,
  wherein the recovery subsystem (13) is configured to receive logging information from the one or more TP subsystems (11), and to store logging information in transaction log records in a recovery storage (25);
  the recovery subsystem (13) is configured to access the one or more resource subsystems (12) to perform, in the one or more resource subsystems (12), recovery actions in the event of failures, based on the logging information, and
  the recovery subsystem (13) is able to run without any functionality of the one or more TP subsystems (11) being available.

31 Claims, 10 Drawing Sheets

(51) Int. Cl.
*G06F 16/28* (2019.01)
*G06F 16/25* (2019.01)

(58) Field of Classification Search
USPC .................................................... 714/15, 18
See application file for complete search history.

(56) References Cited

U.S. PATENT DOCUMENTS

| | | | |
|---|---|---|---|
| 5,504,899 | A | 4/1996 | Raz |
| 5,524,205 | A | 6/1996 | Lomet |
| 5,701,480 | A | 12/1997 | Raz |
| 5,734,897 | A | 3/1998 | Banks |
| 5,806,065 | A | 9/1998 | Lomet |
| 5,806,074 | A | 9/1998 | Souder |
| 5,870,763 | A | 2/1999 | Lomet |
| 5,933,838 | A | 8/1999 | Lomet |
| 5,946,698 | A | 8/1999 | Lomet |
| 5,956,509 | A | 9/1999 | Kevner |
| 6,067,550 | A | 5/2000 | Lomet |
| 6,076,078 | A | 6/2000 | Camp |
| 6,151,607 | A | 11/2000 | Lomet |
| 6,182,086 | B1 | 1/2001 | Lomet |
| 6,208,345 | B1 | 3/2001 | Sheard |
| 6,233,585 | B1 | 5/2001 | Gupta |
| 6,272,515 | B1 | 8/2001 | Fouquet |
| 6,298,478 | B1 | 10/2001 | Nally |
| 6,457,065 | B1 | 9/2002 | Rich |
| 6,477,580 | B1 | 11/2002 | Bowman-Amuah |
| 6,640,244 | B1 | 10/2003 | Bowman-Amuah |
| 6,671,686 | B2 | 12/2003 | Pardon |
| 6,714,962 | B1 | 3/2004 | Helland |
| 7,290,056 | B1 * | 10/2007 | McLaughlin, Jr. .......................... H04L 43/0852 709/201 |
| 10,810,274 | B2 * | 10/2020 | Thomson ........... H04N 21/2393 |
| 2002/0013846 | A1 | 1/2002 | Vuong |
| 2002/0049776 | A1 * | 4/2002 | Aronoff ................. G06F 16/27 |
| 2003/0005172 | A1 | 1/2003 | Chessell |
| 2004/0148397 | A1 * | 7/2004 | Aronoff .............. G06F 11/2025 709/227 |
| 2010/0169284 | A1 * | 7/2010 | Walter ................ G06F 11/1474 707/682 |
| 2017/0351585 | A1 * | 12/2017 | Bourbonnais .......... G06F 16/27 |
| 2019/0370379 | A1 * | 12/2019 | Krojzl ................. G06F 11/2092 |
| 2020/0218712 | A1 * | 7/2020 | Urry ....................... G06F 16/27 |

OTHER PUBLICATIONS

Ouyang, Jinsong et al. "An Approach Commit and Transparent Compensation" http://citeseerx.ist.psu.edu/viewdoc/download?doi=10.1.1.22.7611&rep=rep1&type=pdf. Dec. 2, 1999.

Haerder T, Rothermel K: Concurrency Control Issues in Nested Transactions: VLDB Journal, vol. 2, No. 1, 1993, pp. 39-74.

European Search report for EP 10003720; search completed May 27, 2010.

Ouyang et al., CTP: An Optimistic Commit Protocol for Conv, Internet Article, Online!, URL: www.hpl.hp.com/techreports/2001IHPL-2001-20.pdf, Jan. 26, 2001, pp. 1-11.

Pardon et al., CheeTah: A Lightweight Transaction Server for Plug-and-Play Internet Data Management, Proceeding of the 26th VLDB Conference, Sep. 10, 2000, pp. 210-219.

Schumann Et Al., Recovery-Management in the RelaX Distributed Transaction Layer, Proceedings of the Symposium on Reliable Distributed Systems, Oct. 10, 1989, pp. 21-28.

European Written Opinion for EP 02405944; search completed Sep. 30, 2004.

Bradshaw et al., Transaction scheduling in Dynamic Composite Multidatabase Systems, Dept of CS, U of Waterloo, Tech Report CS 94-11, Internet Article, www.cs.uwaterloo.ca/research/tr/1994/11/9411.pdf, 1994.

Bradshaw, Dexter et al "Transaction Scheduling in Dynamic Composite Multidatabase Systems." IBM Centre for Advanced Studies Conference Proceedings. IBM Press: 1995.

* cited by examiner

MTT = Max Transaction Timeout
D = Transaction duration until application logic requests commit
Ts = start time of transaction
Tp = prepare time of transaction
Tc = time at which COMMITTING record is accepted by recovery subsystem $D_{2PC}$ = Max allowed delay between Tp and Tc
Ts = start time of transaction
Tp = prepare time of transaction
Tc = time at which COMMITTING record is accepted by recovery subsystem

Reconstructing Transaction Log

| "First" resource | "Second" resource | GTID's reconstructed log entry |
|---|---|---|
| Xid1(GTID, BQ1) | No XID for this GTID | None: keep Xid1 for presumed abort |
| No XID for this GTID | Xid2(GTID, BQ2) | Store COMMITTING entry in the log |
| Xid1(GTID, BQ1) | Xid2(GTID, BQ2) | Store COMMITTING entry in the log |

TRANSACTION PROCESSING SYSTEM, RECOVERY SUBSYSTEM AND METHOD FOR OPERATING A RECOVERY SUBSYSTEM

The invention relates to the field of distributed transaction processes in cloud computing applications.

BACKGROUND

Today's cloud computing paradigm encourages applications to be deployed on virtual machines, some of which may not have disk access. Also, dynamic scalability is achieved by adding or removing application instances to/from such a virtual cluster farm. This is called "elasticity": the cluster can easily grow or shrink to adapt to changing workloads over time.

Classical transaction processing systems were not designed with these characteristics in mind: most of the technology is decades old, whereas cloud computing is relatively new. This means that most transaction processing architectures would not work well in such a cloud setting. For instance, if the cloud infrastructure makes the availability of hard disks non-trivial, that is, if it is not sure whether a hard disk or, generally, a storage location can be reached, then it would not be easy to deploy a transaction processing application that requires such a disk.

Also, elasticity implies that application nodes can be killed at any time—so in a distributed transaction setting this means that care must be taken to cleanup any pending transactions that are a result of that. This cleanup process is called recovery, and traditional recovery subsystems were not designed for cloud environments.

There is a need to support online transaction processing (OLTP) by such an elastic infrastructure. Transaction processing is information processing in computer science that is divided into individual, indivisible operations called transactions. Each transaction must succeed or fail as a complete unit; it can never be only partially complete. Online transaction processing (OLTP) relates to information systems that facilitate and manage transaction-oriented applications, typically for data entry and retrieval transaction processing, for example for order entry, retail sales, and financial transaction systems. Typically, OLTP applications are high throughput and insert or update-intensive in database management. These applications can be used concurrently by hundreds of users, and usually require support for transactions that span a network and may include more than one company. Goals of OLTP applications are availability, speed, concurrency and recoverability.

OLTP applications can comprise, for example:
electronic commerce, involving the ordering of goods or services, a financial transaction, the delivery of the goods or services, etc. Goods or services can be physical wares, the delivery of software or of digital files in general, the booking of a flight, etc. For example, a customer microservice, order microservice, product microservice and shipment microservice each can manage its own, associated database and provide (transactional) services to the other microservices. An ordering and delivery process involves transactions across the microservices;
making sure that computer messages are processed exactly once, that is, they must be guaranteed to be processed, but may not be processed more than once, while at the same time allowing re-delivery of the message in the event of a failure of the processing;
making sure that a message is sent only if a corresponding database entry can be updated. For example, in an ordering system or in financial transaction system, an order status or an account balance may only be updated if a message to a co-operating system can be queued to be sent;
in inventory management, updating an inventory in accordance with sales of items registered at a point of sale;
maintaining a hot backup of a computer database, that is, a database that maintains a synchronous replica of another database.

In the following, the term "transaction processing" (TP) can be used in place of "online transaction processing" (OLTP) for brevity. A transaction processing subsystem provides transactional services to other subsystems. Such a service can be a microservice.

It is an object of the invention to provide for elements of a distributed transaction architecture that supports elastic cloud applications and addresses the challenges involved.

SUMMARY

A transaction processing system comprises one or more transaction processing (TP) subsystems executed on a TP server, a recovery subsystem, executed on a recovery server and one or more resource subsystems executed on one or more resource servers. The TP subsystems are configured to access the one or more resource subsystems, wherein the TP server is not the same server as the recovery server, and
wherein the recovery subsystem itself, or a DBMS log that the recovery subsystem is configured to read from and to write to, is configured to clean up pending transactions created in the transaction processing system, in the event of failures,
wherein the recovery subsystem is configured to receive logging information from the one or more TP subsystems, and to store logging information in transaction log records in a recovery storage;
the recovery subsystem is configured to access the one or more resource subsystems to perform, in the one or more resource subsystems, recovery actions in the event of failures, based on the logging information, and
the recovery subsystem is able to run without any functionality of the one or more TP subsystems being available.

The resource subsystem can be connected to the physical world in that data controlled by the resource subsystem controls actions in the physical world or is tied to real-life events. Such actions and events take place in the real or physical world, as opposed to a representation of the real or physical world in a computer system. Thus, such actions and events take place outside the computer system or systems on which the transaction processing system is executed. This can be, for example, the delivery or transfer of goods or money and/or the providing of services.

In more detail, committing or rolling back transactions affects the state of data controlled by the resource subsystems, and the data in turn controls actions in the real world. Other data maintained by the resource subsystems and used by transactions is tied to events in the real world.

For example, if a transaction is committed, it represents an irrevocable decision and can trigger the delivery or transfer of goods or money and/or the providing of services. Such services can be, inter alia, the booking of physical resources for use, such as a seat at an event or in a vehicle or airplane.

The committing of the transaction in turn can be initiated by a user interaction, through a client device and through operation of the system. In the event that recovery becomes necessary, the committing of the transaction is controlled through the recovery subsystem. Thus, decisions made by the recovery subsystem how to perform recovery actions, e.g. by committing or aborting transactions, control the effects of the transaction processing system in the physical world.

For example, the roll back of a transaction, controlled by the recovery subsystem, can avert a real-life event in the physical world which would otherwise have followed a commit.

Such effects can be the abovementioned delivery or transfer of goods or money and/or the providing of services, the consistent replication of a database, etc.

The TP server not being the same server as the recovery server can mean, in other words, that the TP subsystem and the recovery subsystem are executed on different servers. A consequence of this is that in the event of a failure, the TP subsystem can become non-operational but the recovery subsystem can continue to be operational.

The recovery storage is a physical storage that can be written to and read from by a computer. It can be implemented as part of the recovery server or as a separate entity.

Failures can be, for example, loss of messages, loss of communication between subsystems, subsystems not being operational for a limited time interval or permanently. A failure can also be called a crash.

The recovery subsystem or the recovery logic does, in order to be executed and in particular in order to perform recovery actions in the resource subsystem, not depend on the TP subsystem or TP logic being operational. In other words, the recovery subsystem can run or operate on its own without calling any TP logic.

In embodiments, the one or more recovery subsystems run on different nodes than the one or more TP subsystems.

A node or application node can be a part of a clustered computing system. A node typically executes applications (also called application logic), it can run independently from other nodes and can communicate with other nodes. Such communication can be, for example, by messages or (remote) procedure calls or HTTP calls. As mentioned initially, in an elastic system nodes can be stopped and started at any time, and communication is not guaranteed to succeed.

A node can be a real or virtual computer in a computer network. A node can be a process or service, with one or several such processes or services running on the same real or virtual computer.

The recovery subsystem can be used by third-party TP vendors to delegate transaction logging and recovery. As a result these third-party vendors do not have to implement and maintain their own transaction recovery.

Information can be transmitted between subsystems through hardware communication interfaces and/or through shared data storage.

In embodiments, the recovery subsystem is configured to receive, from a TP subsystem,
    logging information representing a COMMITTING record, comprising at least one global transaction id or at least one transaction identifier or Xid, each global transaction id or transaction identifier identifying a transaction to be committed in one of the one or more resource subsystems, and
    logging information representing a TERMINATED record, the TERMINATED record representing a global transaction id, which identifies a transaction as having been terminated.

If the DBMS log is used, it can be configured to receive, from a TP subsystem,
    logging information representing a COMMITTING record, comprising at least one global transaction id or at least one transaction identifier or Xid, each global transaction id or transaction identifier identifying a transaction to be committed in one of the one or more resource subsystems,
    and to receive, from the recovery subsystem, at least one of
    logging information representing a TERMINATED record, the TERMINATED record representing a global transaction id, which identifies a transaction as having been terminated; and
    commands to delete COMMITTING records, identifying them by at least a global transaction id or at least one transaction identifier or Xid.

In embodiments, the TERMINATED record represents a global transaction id by comprising the global transaction id.

In embodiments, the TERMINATED record represents a global transaction id by comprising two or more transaction identifiers or Xids representing transactions that contribute to the global transaction. If all the transactions with these Xids are TERMINATED, this information is equivalent to the global transaction being TERMINATED.

In embodiments, only the GTID is logged in the COMMITTING record, but not the Xid.

In embodiments, the recovery subsystem keeps the logging information from the one or more TP subsystems in a shared database that is accessible to more than one independently operable recovery nodes.

As a result, such recovery nodes can be started up anywhere and be used to cleaning up pending transactions in resource subsystems as long as they have access to the database and to the resource subsystems. Thus there is no single point of failure, and if a recovery node dies, then another recovery node can be set up and activated. The recovery nodes do not have to be operable or on-line at the same time.

In embodiments, the recovery subsystem is configured to receive logging information from more than one TP subsystem.

Thus, the recovery subsystem can be used to recover transactions that span multiple TP subsystems—so no distributed recovery protocol is needed between separate recovery subsystems and recovery does not depend on the availability of third-party recovery subsystems. This gives the possibility of having a single recovery subsystem for a plurality of collaborating TP subsystems. This in turn reduces overall system complexity and makes it possible to recover transactions with a single recovery subsystem without the need to collaborate with others.

In embodiments, the recovery subsystem is configured to be triggered to perform recovery actions by a resource subsystem becoming available.

In embodiments, a resource subsystem becoming available can be detected by the recovery system regularly performing scans across all known resources. and/or by a recovery system receiving a message or event informing the recovery subsystem that the resource subsystem is available.

Alternatively, or in addition, the recovery subsystem can be configured to perform recovery actions at regular time intervals.

Alternatively, or in addition, the recovery subsystem can be configured to perform recovery actions when failure of a TP subsystem is detected.

In embodiments, the recovery subsystem is made available as a separate service that is shared between some (or all) TP subsystems in the same transaction recovery domain.

In embodiments, the recovery domain can be specified by a recovery domain identifier. A transaction can be said to be in the recovery domain, or to belong to the recovery domain, if its Xid comprises the recovery domain identifier.

The Xid can comprise the recovery domain identifier as part of its branch qualifier (or, alternatively, this could be included in its GTID part).

In embodiments, the recovery subsystem is configured, for each one of one or more resource subsystems, and for a recovery domain corresponding to the recovery subsystem,
- to retrieve from the resource subsystem a list of prepared transactions, each of these prepared transactions being identified by a transaction identifier or Xid and belonging to the recovery domain;
- to check, for each transaction in the list of prepared transactions, whether the recovery subsystem has in its transaction log records a corresponding COMMITTING record comprising the same Xid;
- if there does not exist such a corresponding COMMITTING record, to perform a presumed abort of the transaction with this Xid; or
- if there exists such a corresponding COMMITTING record, to perform a replay commit of the transaction with this Xid.

In embodiments, only the presence of the GTID is checked in the COMMITTING record, but not the presence of an Xid.

In embodiments, the recovery subsystem is configured, for performing a presumed abort of a transaction with one or more Xids, to
- rollback in the resource subsystems the prepared transactions with these one or more Xids; and
- if rollback succeeds for all of the one or more Xids, to store, in the transaction log records, a TERMINATED record comprising these Xids.

Note: usually, there is one prepared transaction per resource subsystem, so if multiple transactions are prepared, multiple resource subsystems are involved.

In embodiments, the recovery subsystem is configured, for performing a replay commit of a transaction with an Xid, to
- commit in the resource subsystem the prepared transaction with this Xid; and
- if the commit succeeds, to mark, in the transaction log records, the transaction with this Xid as being TERMINATED;
- if all transactions of a COMMITTING record are marked as TERMINATED, to mark the COMMITTING record as TERMINATED.

Marking a record as being TERMINATED, or logging a TERMINATED record, can be implemented, for example, by
- changing a record to have a status TERMINATED instead of COMMITTING, or
- logging a new record for the same global transaction, incorporating the Xid and showing its status as TERMINATED (and if all Xids of the global transaction are TERMINATED, then to change the status of the global transaction to TERMINATED), or
- deleting the record from the transaction log records.

In embodiments, the recovery subsystem is configured, for each one of one or more resource subsystems, and for a recovery domain corresponding to the recovery subsystem,
- to retrieve from the resource subsystem a list of prepared transactions, each of these prepared transactions being identified by a transaction identifier or Xid and belonging to the recovery domain;
- to check, for each Xid in the COMMITTING records of in the transaction log records, whether there is, in the list of prepared transactions, a corresponding transaction with this Xid,
- if there does not exist such a corresponding transaction record, record in the transaction log, the Xid as being TERMINATED,
- if all transactions of a COMMITTING record are marked as TERMINATED, to mark the COMMITTING record as TERMINATED.

This allows the recovery subsystem to identify and forget about pending transactions that still exist in the recovery logs but that are no longer known to any resource.

Generally, records marked as TERMINATED can be deleted immediately, or by a garbage collection procedure.

In embodiments, the recovery subsystem comprises in its COMMITTING records the unique resource names, and the recovery subsystem is configured to use the unique resource names in recovery. That is, it uses these logged unique resource names to determine the resource subsystems to query.

In embodiments, the recovery subsystem is configured to ascertain that all known resource subsystems have been checked, and if the Xid is not found, then to assume it to have TERMINATED.

In embodiments, the recovery subsystem is configured, for each one of one or more resource subsystems and for a recovery domain corresponding to the recovery subsystem,
- to retrieve from the resource subsystem a list of prepared transactions, each of these prepared transactions being identified by a transaction identifier or Xid and belonging to the recovery domain;
- to check, for each transaction in the list of prepared transactions, whether the recovery subsystem has in its transaction log records a corresponding COMMITTING record comprising the same Xid;
- if there does not exist such a corresponding COMMITTING record, to perform a presumed abort of the transaction with this Xid only if such a corresponding COMMITTING record still does not exist after at least a predetermined time delay.

In embodiments, only the presence of the GTID is checked in the COMMITTING record, but not the presence of an Xid.

In more words, the recovery subsystem is configured, if there does not exist such a corresponding COMMITTING record, to check again, after the predetermined time delay, whether the recovery subsystem has in its transaction log records a corresponding COMMITTING record comprising the same Xid, and only if this is not the case, to perform a presumed abort of the transaction with this Xid.

The time delay can be stored as a parameter of the TP subsystem and/or the resource subsystem and/or the recovery subsystem or another shared storage location. It can be determined by a user, or it can be dynamically set according to performance of the TP or another subsystem.

In embodiments, the recovery subsystem is configured to receive, from a TP subsystem,
- logging information representing a COMMITTING record, comprising at least one transaction identifier or Xid, each transaction identifier identifying a transaction to be committed in one of the one or more resource subsystems, and a timeout parameter specifying a point in time, and wherein the recovery subsystem is configured, if a current time value representing actual time lies after the point in time specified in the logging information, to reject the COMMITTING record, In embodiments, only the GTID is logged in the COMMITTING record, but not the Xid.

The timeout parameter specifying the point in time can be determined as an absolute time value, given a starting point in time and a relative time value. A relative time value can be called a time difference value or time delay value.

Rejecting means to let the TP subsystem know that the COMMITTING record cannot be accepted. This can be done, for example, by the recovery subsystem notifying the TP subsystem or by the TP subsystem checking a status that is controlled by the resource subsystem.

Rejecting can mean, in addition to notifying the TP subsystem, not to store the logging information in a transaction log record.

In embodiments, the recovery subsystem is configured to receive, from a TP subsystem,
  logging information representing a COMMITTING record, comprising at least one transaction identifier or Xid, each transaction identifier identifying a transaction to be committed in one of the one or more resource subsystems, and a timeout parameter specifying a point in time, and wherein the recovery subsystem is configured, if a current time value representing actual time lies after the timeout parameter specified in the logging information, to reject the COMMITTING record, In embodiments, only the GTID is logged in the COMMITTING record, but not the Xid.

In embodiments, the timeout parameter is computed, by the TP subsystem, from a start time of a transaction by adding, as a TP timeout value, a maximum transaction time (MTT). This is a maximum time in which the transaction must be executed, as measured from the start time. In this case, the predetermined time delay used by the recovery subsystem for re-checking the existence of a corresponding COMMITTING record can be at least as long as the maximum transaction time (MTT). In particular, it can be chosen to be the MTT plus a safety margin time value.

In embodiments, the timeout parameter is computed, by the TP subsystem, from a prepare time of a transaction by adding, as a TP timeout value, a maximum delay between transaction prepare and commit ($D_{2PC}$). This is a maximum time in which the transaction must be executed, as measured from the prepare time. In this case, the predetermined time delay used by the recovery subsystem for re-checking the existence of a corresponding COMMITTING record can be at least as long as the maximum delay between transaction prepare and commit ($D_{2PC}$). In particular, it can be chosen to be the $D_{2PC}$ plus a safety margin time value.

The TP subsystem can be configured to check transactions as they are being invoked, and if a transaction is ready to be committed but the actual time lies after the timeout parameter, not to log a COMMITTING record in the recovery subsystem but to abort the transaction instead.

Other points in time that are related to the processing of transactions in the TP subsystem can be used as reference for the TP timeout value.

In brief, in a combination of the elements described above, the recovery subsystem enforces a configurable maximum timeout such that:
  Presumed abort of a transaction waits for at least until the predetermined time delay expires.
  No committing log records are logged or accepted after the predetermined time delay—that is, the TP timeout value after, for example, the transaction start time or after the prepare time—expires,
  and therefore no transaction can attempt commit after it might have been subject to concurrent presumed abort.

In embodiments, the TP subsystem is configured
  to retrieve from the recovery subsystem one or more predetermined time delays that are used by the recovery subsystem, and to ensure that they are larger than TP timeout values used by the TP subsystem.

In embodiments, ensuring that they are larger can be done by the TP subsystem controlling the recovery subsystem to set all predetermined time delays that are used by the recovery subsystem to values that are larger that all TP timeout values.

In embodiments, ensuring that they are larger can be done by the TP subsystem setting all TP timeout values to values that are smaller than all the time delays that are used by the recovery subsystem.

In embodiments, ensuring that they are larger can be done by the TP subsystem checking all TP timeout values whether they are smaller than all the time delays that are used by the recovery subsystem, and if this not the case, to refuse to start up and to inform an administrator. The checking can be done by the TP subsystem retrieving the time delays from the recovery subsystem, or by the TP subsystem sending the TP timeout values to the recovery subsystem for verification by comparing them to the time delays.

In embodiments, the TP subsystem simply relies on the recovery subsystem to supply the TP timeout values.

In embodiments, wherein the recovery subsystem is based on the DBMS log, the recovery subsystem is configured, for each one of one or more resource subsystems, and for a recovery domain corresponding to the recovery subsystem,
  to retrieve from the resource subsystem a list of prepared transactions, each of these prepared transactions being identified by a global transaction id and belonging to the recovery domain;
  to check, for each transaction in the list of prepared transactions, whether the recovery subsystem has in its transaction log records a corresponding COMMITTING record comprising the same global transaction id;
  if there does not exist such a corresponding COMMITTING record, to perform a presumed abort of the transaction with this global transaction id; or
  if there exists such a corresponding COMMITTING record, to perform a replay commit of the transaction with this global transaction id.

In embodiments, the recovery subsystem is configured, for performing a presumed abort of a transaction with a global transaction id, to
  rollback in the resource subsystems the prepared transactions with this global transaction id.

In embodiments, the recovery subsystem is configured, for performing a replay commit of a transaction with a global transaction id, to
  commit in the resource subsystem all prepared transactions with this global transaction id; and if the commit succeeds for all these prepared transactions, to mark, in the transaction log records, the transaction with this global transaction id as being TERMINATED.

In embodiments, the TP subsystem is configured to verify its resource configurations, including the unique resource names, with the recovery subsystem, to ensure that every resource used by TP is accessible by the recovery subsystem.

In embodiments, this can be done by the TP subsystem verifying that it can communicate with resources of the resource subsystem, sending corresponding communication parameters for communicating with the resources to the recovery subsystem, and the recovery subsystem verifying that it can communicate with the resources. If it fails to communicate, it can notify the TP subsystem. This procedure allows the recovery subsystem to make sure that it will be, if this is needed at a later time, able to reach the resources.

In embodiments of the transaction processing system,
at least one of the one or more TP subsystems is configured to, in the event that it prepares a transaction, publish a TransactionPreparingEvent in a messaging system, for example, an event bus, the TransactionPreparingEvent comprising information identifying at least a global transaction ID and information identifying all resources involved in the transaction, and
the recovery subsystem is configured to, in the event that it raises an exception, in particular because it is blocked from committing or rolling back a transaction, publish a TransactionHeuristicEvent in the messaging system, the TransactionHeuristicEvent comprising an outcome, and information identifying at least a global transaction ID and information identifying a resource involved in the transaction.

The information identifying at least a global transaction ID can be the Xid, or the global transaction ID itself. The information identifying a resource can be an Xid or a unique resource name. The outcome can be, e.g., any of standard heuristic outcomes known in the literature, such as (heuristic) COMMIT, (heuristic) ROLLBACK or (heuristic) MIXED, etc.

A method for operating an application program calling the transaction system, comprises the steps of
the application program receiving, through the messaging system, the TransactionPreparingEvents and the TransactionHeuristicEvents;
the application program logging these events in a log;
the application program logging additional information about its own operation in the log.

In embodiments, the method comprises the additional step of
in the event that the recovery subsystem raises an exception, presenting the events and additional information to a human user, in particular by means of a display device.

In embodiments of the transaction processing system,
at least one of the one or more TP subsystems is configured to, in the event that it is a child TP subsystem that is called from another, parent TP subsystem, logging a linking record comprising the parent TP subsystem's global transaction ID and child TP subsystem's global transaction ID; and
the recovery subsystem is configured to identify a COMMITTING record of the parent TP subsystem, given the child TP subsystem's global transaction ID, by the steps of
retrieving the linking record comprising the child TP subsystem's global transaction ID;
determining, from this linking record, the parent TP subsystem's global transaction ID;
determining, from the parent TP subsystem's global transaction ID, the COMMITTING record comprising this global transaction ID.

The linking record can be implemented, for example, by logging a corresponding PREPARED or INDOUBT or other record (INDOUBT is also a standard state in two phase commit protocols).

In embodiments of the transaction processing system,
the recovery subsystem is configured to determine the child TP subsystem's global transaction ID, given a transaction identifier or Xid of the child TP subsystem, by extracting the child TP subsystem's global transaction ID from the Xid of the child TP subsystem.

In embodiments, the child TP subsystem and the parent TP subsystem are configured to provide logging information to the same recovery subsystem.

In embodiments, this is accomplished by the parent TP subsystem, when calling the child TP subsystem, transmitting a unique recovery domain identifier to the child TP subsystem In embodiments of the transaction processing system,
at least one of the one or more TP subsystems is configured to, when performing, by an invoking transaction, a call to a second TP subsystem, perform the steps of
receiving a return value from the call;
checking whether the return value comprises two-phase commit registration information;
if this is not the case, considering the call as being invalid because the second subsystem was not configured to be transactional, and performing a rollback of the invoking transaction.

In embodiments of the transaction processing system,
at least one of the one or more TP subsystems is configured to, when preparing a transaction and performing a prepare call to a second TP subsystem, include a count of returns received from the second TP subsystem for the same parent transaction; and
the second TP subsystem is configured to perform the steps of
when receiving a prepare call, extracting the count of returns received;
comparing this count with the number of returns sent by the second TP system for the same parent transaction;
if this count and the number of returns have different values, rejecting the prepare call.

Rejecting the prepare call will typically lead to a rollback in both TP subsystems—so that both the parent transaction and the child transaction leave no effects.

In embodiments of the transaction processing system, a DBMS log that the recovery subsystem is configured to read from and to write to, is configured to receive logging information from the one or more TP subsystems, and to store logging information in transaction log records in a recovery storage, and
each of the resource subsystems is configured to perform synchronous replication to a respective resource subsystem failover site; and
a logging DBMS comprising the DBMS log is configured to perform synchronous replication to a respective logging DBMS failover site.

In a recovery subsystem,
for cleaning up pending transactions created in a transaction processing system which comprises one or more transaction processing (TP) subsystems configured to access one or more resource subsystems, in the event of failures, the recovery subsystem itself, or a DBMS log that the recovery subsystem is configured to read from and to write to, is configured to receive logging information from the one or more TP subsystems, and to store logging information in transaction log records;

the recovery subsystem is configured to access the one or more resource subsystems to perform, in the one or more resource subsystems, recovery actions, based on the logging information, and the recovery subsystem is able to run without any functionality of the one or more TP subsystems being available.

This allows the recovery subsystem to perform recovery actions in the event of failures.

In embodiments, the recovery subsystem is executed on a recovery server, and the recovery subsystem is configured to receive logging information from the one or more TP subsystems from a TP server which is not the same server as the recovery server, and to store logging information in transaction log records in a recovery storage.

A method for operating a recovery subsystem in a transaction processing system, wherein the recovery subsystem is arranged to communicate with a transaction processing (TP) subsystem and to communicate with one or more resource subsystems, comprises for cleaning up pending transactions created in a transaction processing system, in the event of failures, the steps of the recovery subsystem itself, or a DBMS log that the recovery subsystem is configured to read from and to write to, receiving logging information from the one or more TP subsystems, and storing logging information in transaction log records;

the recovery subsystem accessing the one or more resource subsystems and performing, in the one or more resource subsystems, recovery actions in the event of failures, based on the logging information, wherein the recovery subsystem is able to run without any functionality of the one or more TP subsystems being available.

A method for reconstructing log records in the event that log records are not available and given an ordered set of two or more resource subsystems comprises the steps of a disaster recovery subsystem, for each one of the ordered set of resource subsystems and for a recovery domain corresponding to the recovery subsystem, retrieving from the resource subsystem a list of prepared transactions, each of these prepared transactions being identified by a transaction identifier or Xid and belonging to the recovery domain, and wherein the Xid is associated with a global transaction ID (GTID);

if, for a particular GTID, an associated Xid is found in a resource subsystem but is not found in the subsequent resource subsystems, then the transactions identified by the GTID are rolled back;

if, for a particular GTID, an associated Xid is found in a resource subsystem but is not found in the preceding resource subsystems, then the transactions identified by the GTID are committed;

if, for a particular GTID, an associated Xid is found in all of the two or more resource subsystems, then all the transactions identified by the GTID can be committed.

A set of (resource) subsystems being ordered means that they can be represented as a sequence, comprising a first and last subsystem. If intermediate subsystems are present, then each of them has a subsequent and a preceding subsystem.

In a simplified embodiment, if a GTID is found in the last resource but not in the first resource then the GTID can be considered committed. Likewise, if a GTID is found in the first resource but not in the last resource then it can be considered rolled back.

The order of resource subsystems specifies an order in which PREPAREs and COMMITs of the resource subsystems are called by the TP subsystem. If a resource subsystem is PREPARED or COMMITTED before another one, it shall be called a preceding or lower order resource subsystem. If a resource is PREPARED or COMMITTED after another one, it shall be called a subsequent or higher order resource subsystem. The same ordering applies not only to a TP subsystem but to any recovery component as well.

An Xid can be associated with a GTID by comprising the GTID.

Rolling back the transactions identified by a GTID can be done by marking the Xid for "presumed abort" and/or immediately performing the "presumed abort".

Committing the transactions identified by a GTID can be done by creating a transaction log record representing a COMMITTING record and/or simply marking the Xid for "replay commit" and/or immediately performing the "replay commit"

If, for a particular GTID, an associated Xid is found in all of the two or more resource subsystems, then the transactions identified by the GTID can be either committed or rolled back, at the discretion of the disaster recovery subsystem. Generally, the choice will be to commit them, for the sake of efficiency.

The disaster recovery subsystem can be the recovery subsystem that lost its transaction log, or it can be a different system which is not used as a recovery subsystem.

The disaster recovery subsystem can be applied to reconstruct log files maintained by a recovery subsystem itself, or a DBMS log that the recovery subsystem is configured to read from and to write to.

In embodiments, the disaster recovery subsystem can replace the recovery subsystem and logging subsystem, thereby implementing logless recovery. It is not necessary to recreate a log in persistent memory. Rather, the corresponding information can be reconstructed, acted upon by doing recovery, and then discarded.

In embodiments, the computer program product for the operation of the recovery subsystem is loadable into an internal memory of a digital computer or a computer system implementing a recovery server, and comprises computer-executable instructions to cause one or more processors of this computer or computer system to execute the method for operating the recovery subsystem and/or for reconstructing log records. In another embodiment, the computer program product comprises a computer readable medium having the computer-executable instructions recorded thereon. The computer readable medium preferably is non-transitory; that is, tangible.

BRIEF DESCRIPTION OF THE DRAWINGS

The subject matter of the invention will be explained in more detail in the following text with reference to exemplary embodiments which are illustrated in the attached drawings, which schematically show.

The examples make reference to XA resources, that is, resources that comply with the XA standard. The XA standard describes the interface between a transaction manager and a resource manager. The goal of XA is to allow multiple resources (such as databases, application servers, message queues, transactional caches, etc.) to be accessed within the same transaction, thereby preserving the ACID properties (Atomicity, Consistency, Isolation, Durability) across applications. XA supports two-phase commit to ensure that all resources either commit or roll back any particular transaction consistently. That is, all resources within the transaction either perform a commit or a roll back.

DETAILED DESCRIPTION

Figures 11, 12:
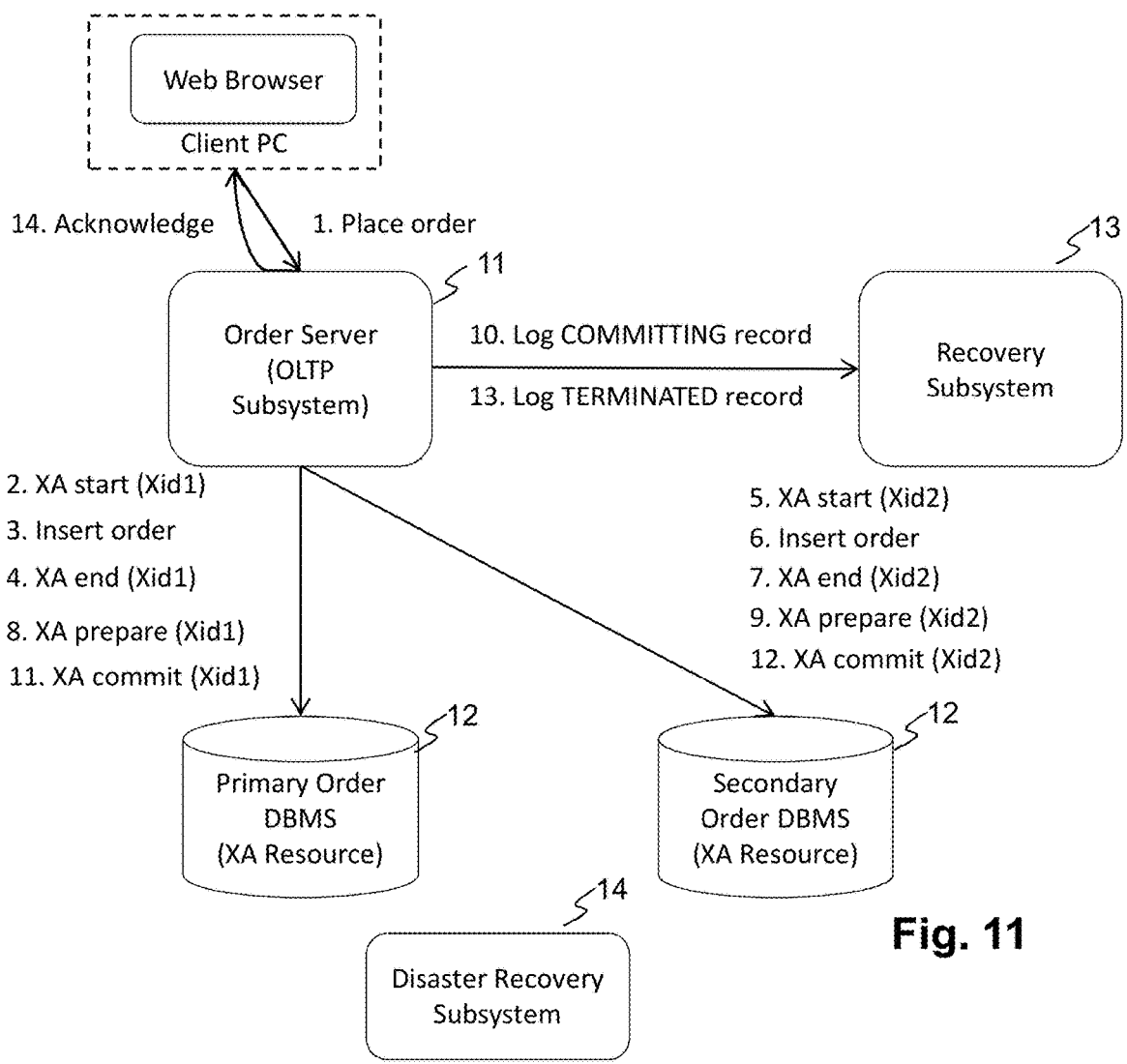
FIG. 11 hot back-up in cloud.
FIG. 12 reconstructing a transaction log.

An example application for OLTP in a cloud environment is shown in FIG. 11, where XA transactions are used to provide an easy hot back-up architecture in the cloud. Clients place orders via an Order Service, hosted on an Order Server. The orders are synchronously replicated in two databases: the primary and secondary order DBMS. This happens in one "global" XA transaction that spans both the primary and secondary DBMS. For recovery purposes, the Recovery Subsystem maintains the logging of the distributed transaction.

The main benefit is that this offers a cheap and easy way to manage hot back-ups in a cloud environment. If one database goes down, the other DBMS still is in a perfectly up-to-date state, thanks to the synchronous replication.

In this example, the client is notified via a direct acknowledgment, but without loss of generality this could just as well be done asynchronously by reading the committed order records in the database and sending an email message to the client.

Other example applications are possible, for instance the Order Server could receive its order placement commands from a message broker instead of directly from a browser.

Figure 1:
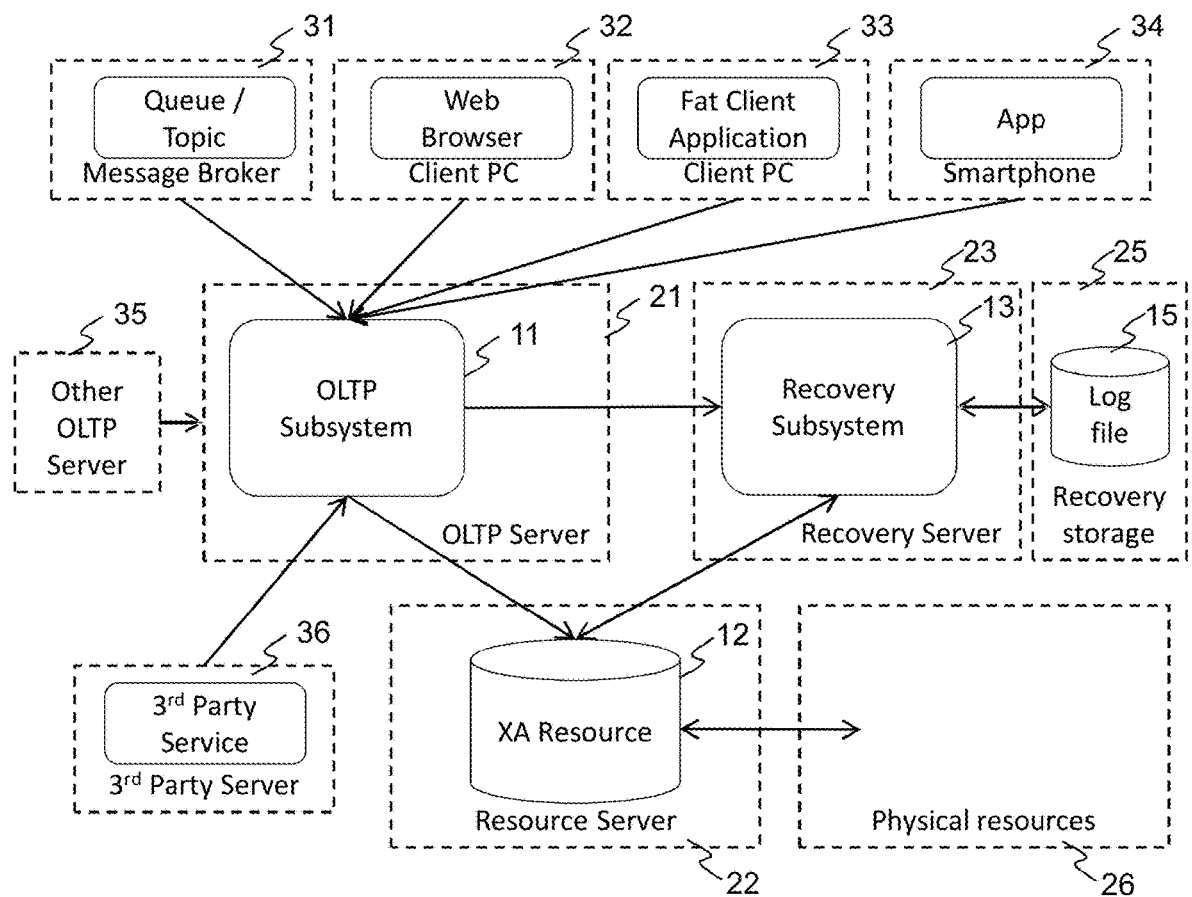
FIG. 1 basic system architecture.

A basic architecture is shown in FIG. 1.

A number of different clients can connect to a single OLTP server 21 or a cluster of OLTP servers 21, each typically hosting an OLTP subsystem 11. An OLTP 21 server typically handles each client request. Clients can be hosted on client hardware devices such as a smartphone 34, a client PC 32, 33, a message broker 31, another OLTP server 35 or any third party server 36. Clients typically connect to the OLTP server or servers 21 over the network via their respective network interfaces.

Users can make use of the system by interacting with the clients through input devices such as a keyboard, computer mouse, touchscreen, voice interface and the like, and output devices such as display, speaker, signal light and the like.

The users can use the system for electronic commerce applications.

The OLTP server or servers 21 host the OLTP subsystem 11, described in more detail below, which communicates with the recovery server 23 where the recovery subsystem resides and the resource server 22 (which maintains the persistent records that typically reflect the results from the client's requests).

The recovery subsystem 13 maintains the transaction log records in a well-defined physical storage location or recovery storage 25: the "log file" 15.

Other embodiments could have additional hardware components like (but not limited to) load balancers for incoming client requests.

Components and Responsibilities

The architecture comprises the following main components:

OLTP (Sub) System 11

Each application node in a clustered application comprises an OLTP subsystem 11 that starts/ends transactions, supports connection pooling and XA transaction enlist/delist (also called start/end in XA terms) as well as normal commit operations. In other words, all distributed transaction functionality except recovery is done here. OLTP subsystem instances can be started and stopped at any time, because there is always the recovery subsystem that cleans up pending transactions in the background. This makes the system robust towards failure of subsystems. The OLTP subsystem collaborates with the recovery subsystem by logging transaction log records in the recovery subsystem. The recovery system then has all the information it needs to handle recovery.

It is possible to implement an OLTP subsystem 11 without any persistent storage, such as a hard disk, for persistent storage of the data related to the transactions that are processed by the OLTP subsystem.

Recovery (Sub) System 13

The transaction logging and recovery functionality resides here. For cloud deployments, this subsystem can be deployed on one (or more) specialized nodes that have access to the resource subsystem 12. The recovery subsystem 13 is typically not required to be elastically deployable, although it can be. Typically, the recovery server 23 is a computer that is separate from a computer that acts as the OLTP server 21 running the OLTP subsystem 11. In theory, the recovery subsystem can also be deployed on the same node or computer as the OLTP subsystem, in which case it still operates independently of the OLTP logic.

Logging (Sub) System 15

This is a part of or connected to the Recovery Subsystem 13 that accepts and maintains transaction log records. The logging subsystem 15 typically stores log records in some well-defined physical storage location that it maintains. The logging subsystem 15 can maintain a log file or log database, or use persistent RAM or even a distributed cache database with two or more nodes. The logging subsystem 15 can be implemented on the computer hardware of the recovery server 23 or on separate recovery storage 25 computer hardware.

XA Resource or Resource Subsystem 12

A back-end resource supporting, for example, XA transactions and XA recovery. Typically, this is a DBMS or a message broker. Under normal circumstances, there is more than one resource subsystem 12 and the distributed transaction environments concern more than one XA Resource (although not explicitly shown in the FIG. 1). Alternatively, the terms "resource" or "resource subsystem" will be used, depending on the context.

The resource subsystem 12 can be connected to the physical world in that data controlled by the resource subsystem 12 triggers or reflects actions or events in the physical world. This can be, for example, the delivery or transfer of goods and/or the providing of services.

Additional Terminology

There are some additional concepts that are useful for understanding the rest of this document:

Elasticity: as mentioned above, with more details at https://en.wikipedia.org/wiki/Elasticity_(cloud_computing)

XA: "eXtended Architecture" by X/Open group—the classic standard for distributed transaction processing interoperability; see http://pubs.opengroup.org/onlinepubs/009680699/toc.pdf OLTP: online transaction processing, an application style focused on short update transactions; also see https://en.wikipedia.org/wiki/Online_transaction_processing Micro-service architecture: a light-weight service-oriented architecture with focused services that do one thing right; also see https://martinfowler.com/articles/microservices.html and https://en.wikipedia.org/wiki/Microservices BAC Theorem: The publication "Consistent Disaster Recovery for Microservices: the BAC Theorem", Guy Pardon, Cesare Pautasso, Olaf Zimmermann, (IEEE Cloud Computing, January/Feburary issue 2018 with publication date Mar. 28 2018—see https://ieeexplore.ieee.org/document/8327550) provides an introduction to the issues encountered in a distributed transaction architecture. It is hereby incorporated by reference.

Xid: the transaction identifier used to communicate with the XA Resource. Every Xid consists of 2 main parts: the "global transaction id" (or "GTID") and the "branch qualifier" (or "BQ"). As per XA specification, all resource accesses for the same distributed OLTP transaction share the same global transaction id. The branch qualifier may or may not be the same depending on the context.

Recovery domain: the set of distributed transactions that are recovered by the same recovery subsystem. For simplicity (but without loss of generality), we assume that every distributed transaction belongs to exactly one recovery domain. For example, the recovery domain can be encoded as part of the branch qualifier of the Xid (but other encodings are possible). A recovery domain can, for example, be specified by the OLTP when creating a transaction. It can be specified by incorporating a unique recovery domain identifier in the branch qualifier. All transactions comprising this recovery domain identifier belong to this recovery domain. A recovery domain exists because of pragmatic administration concerns: it defines one central realm to manage recovery of the OLTP cluster's transactions.

Message broker: a specialized database system focused on store-and-forward delivery of messages between application components. Most brokers support two forms of store-and-forward storage: queues (each message delivered to the first consumer only) and topics (every message is delivered to all known consumers).

DBMS or "Database Management System": a database program, that is, a software system that uses a standard method of cataloguing, retrieving, and running queries on data. DBMS implementations often use SQL statements for expressing queries. In the present context, different DBMSs can be present for different functions, and should not be confused: on the one hand, resources can be implemented as DBMS. On the other hand, the logging of events can be implemented by (different) DBMS.

Elastic Scaling

Figure 2:
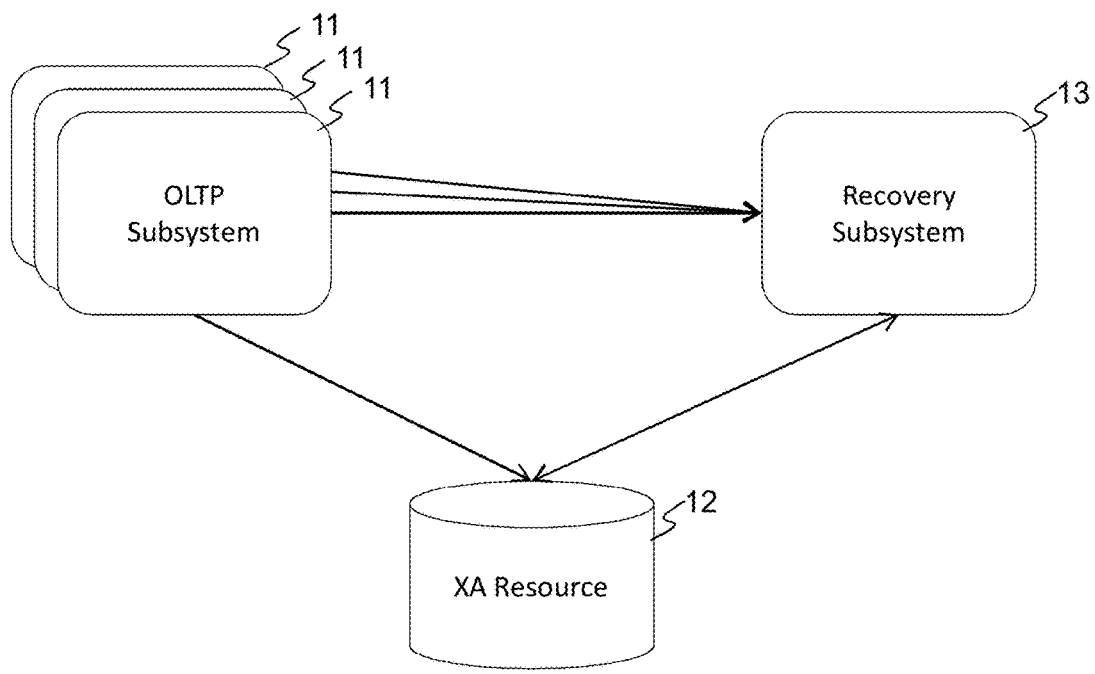
FIG. 2 elastic scaling by adding OLP servers.

As FIG. 2 shows, elastic scaling is merely a matter of adding more OLTP subsystems. This amounts to adding more application nodes in the application cluster because each application node has its own OLTP subsystem.

Elastic scaling concerns adding more application nodes in the same recovery domain, so the different OLTP subsystems use the same recovery subsystem to delegate logging and recovery to.

The recovery domain is shared because then there can be one responsible component administering the termination of all OLTP transactions in the same cluster. As shown below, this component has all the required information to do that correctly.

OLTP Commit: the "Happy Path"

Figure 3:
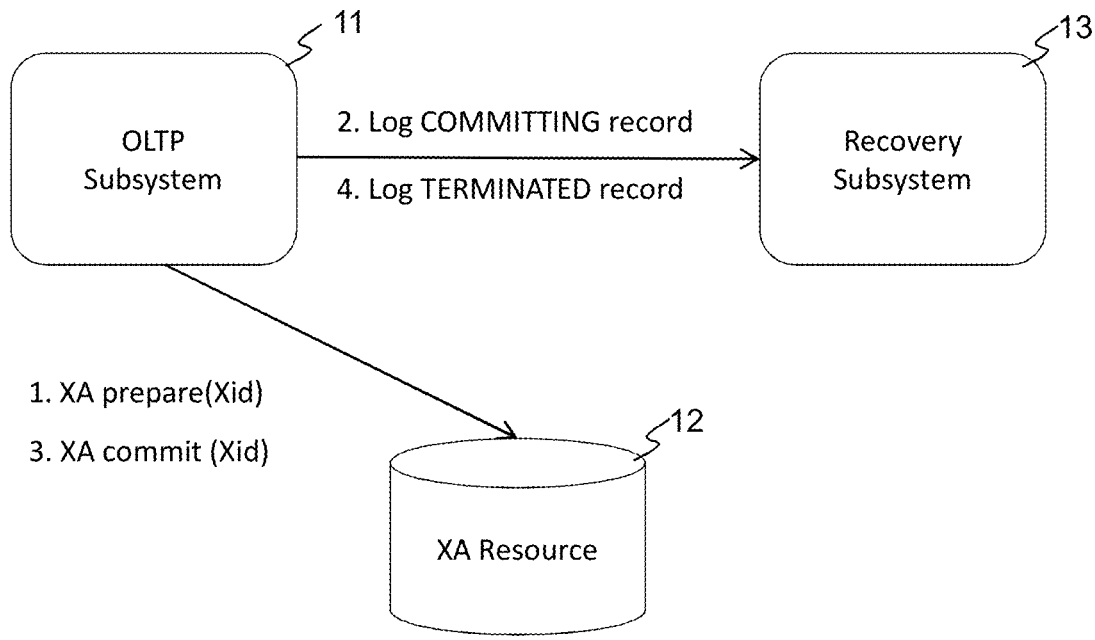
FIG. 3 OLTP commit: the happy path.

Presumably the normal case, a typical transaction commits (or rolls back) entirely within the OLTP subsystem (assuming it is not interrupted by a shutdown of the OLTP subsystem). This is shown in FIG. 3.

For the normal case, the OLTP subsystem handles the entire transaction (and its XA operations) from start to finish. It logs to the recovery subsystem just in case, because there is no way to predict if a failure or crash will interrupt the transaction being processed (in which case the recovery subsystem needs to take over). Logging COMMITTING or TERMINATED records are common to most (if not all) transaction processing systems so we will not elaborate on these here.

It is important to note that any XA commits by the OLTP subsystem happen only after step 2 (logging the COMMITTING record) worked. This means that as long as a transaction has no COMMITTING record in the recovery subsystem, the recovery subsystem may safely assume that no XA Resource has received a XA commit instruction for the transaction. This is important for recovery.

Without loss of generality, some distributed OLTP scenarios may log additional records such as an IN-DOUBT record (in particular, cases where the OLTP transaction spans multiple OLTP subsystem nodes as in micro-service applications). Deciding what to log when is the responsibility of the OLTP subsystems involved and has no fundamental impact: the segregation of responsibilities between the OLTP subsystem and the recovery subsystem remains the same, i.e. logging is decided by the OLTP subsystem (but delegated to the recovery subsystem), and recovery is handled independently (to the extent possible) by the recovery subsystem.

The log records of a transaction are identified by the global transaction id (also found in the Xid). The logging system can be seen as a key-value store, where the keys are the global transaction ids and the values are the log records. Subsequent log records for the same transaction overwrite any previous entry found. Step 4 (logging the TERMI- NATED record) conceptually removes the transaction's key from this map, so the transaction no longer has a relevant log entry after this.

The log records of a transaction typically contain at least all the Xids for the resources accessed. This is possible because all resource accesses have already happened at the time of logging a COMMITTING record (step 2 in the FIG. 3), thereby recording the Xids used in the XA prepare steps (step 1 in FIG. 3).

Log records can also contain the date-time at which a transaction expires. For optimal efficiency, the recovery subsystem may refuse to log certain records whose transaction has already expired (such as—but not limited to—COMMITTING records).

Figure 10:
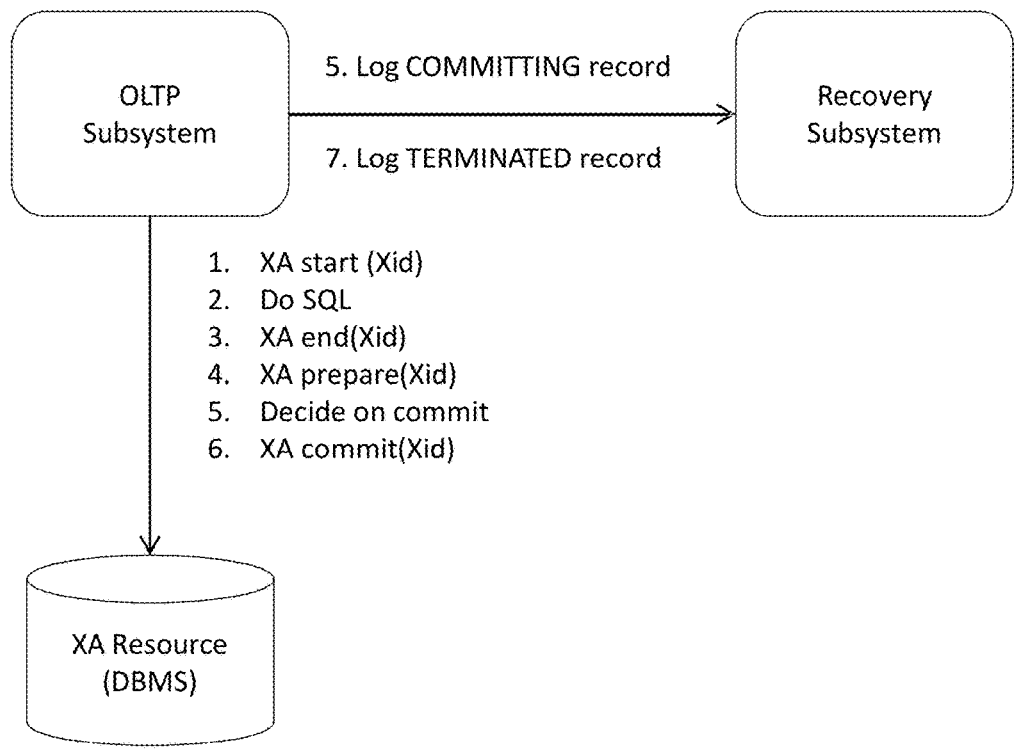
FIG. 10 OLTP: full XA interactions.

For brevity, this above explanation only dealt with the 2-phase commit cycle of the OLTP transaction. A full OLTP cycle is shown in FIG. 10. Steps 1-5 are the exclusive responsibility of the OLTP subsystem. The rest (termination of the transaction) can also be done by the recovery subsystem (as discussed below).

The individual steps are, in accordance with the XA specification:

XA start (Xid): starts a transaction and defines its Xid or transaction identifier. This notifies the resource subsystem 12 that the next SQL statement will belong to this transaction.

Do SQL: a SQL statement.

XA end(Xid): declares that the specified ACTIVE transaction is finished and it changes its state to IDLE XA prepare(Xid): prepares an IDLE transaction for commit, changing its state to PREPARED Decide on commit: this is part of the two phase commit protocol. It typically involves confirmation that the COMMITTING log record has been accepted by the recovery subsystem.

XA commit(Xid): definitely commits and terminates a transaction which has already been PREPARED.

How Recovery Works

Recovery can be done at regular intervals called "recovery scans". Without loss of generality, our current embodiment features recovery progress driven by Xids found in a particular XA Resource (hence indirectly also be driven by resource availability). More precisely: recovery advances as Xids are retrieved from the resources involved and dealt with accordingly. Eventually, recovery is expected to log TERMINATED records for all pending transactions, because that is the whole purpose of recovery in the first place.

The following paragraphs describe how the recovery subsystem works for some typical scenarios. This section is by no means meant to be exhaustive: the idea is merely to show some typical scenarios.

Presumed Abort

Figure 4:
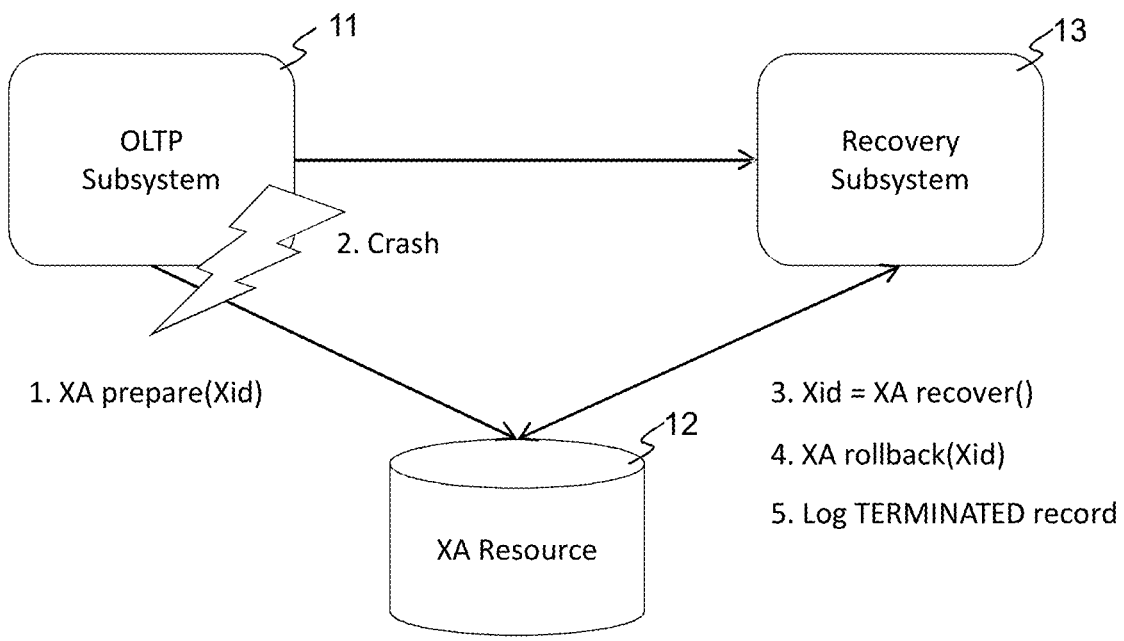
FIG. 4 recovery with no committing entry: presumed abort.

What happens after a failure of the OLTP subsystem? This is shown in FIG. 4. If a transaction has no COMMITTING record in the recovery subsystem, then the recovery subsystem may safely assume that the transaction can be aborted. This is called "presumed abort" in the literature. This is correct recovery, because the OLTP subsystem has not sent commit to any XA Resource yet (since this happens only after the COMMITTING record was logged).

As can be seen in the illustration, the recovery subsystem does the following:

1. It interrogates the XA Resource to find any dangling prepared transaction (identified by its resource-local identifier called "Xid" in XA). This is step 3 in FIG. 4.

2. If there is no corresponding COMMITTING record, the recovery subsystem will typically opt to rollback ("presumed abort"). This is shown as step 4 in FIG. 4.

3. When done, the recovery subsystem also marks the transaction as TERMINATED so it can forget about the log entry for later recovery scans (step 5 in FIG. 4).

Note that the recovery subsystem can check for a COMMITTING log entry by looking up the Xid's global transaction id as a key in the logging system. This works because both the Xid and the logging system share the same global transaction id for the same transaction.

Commit Replay

Figure 5:
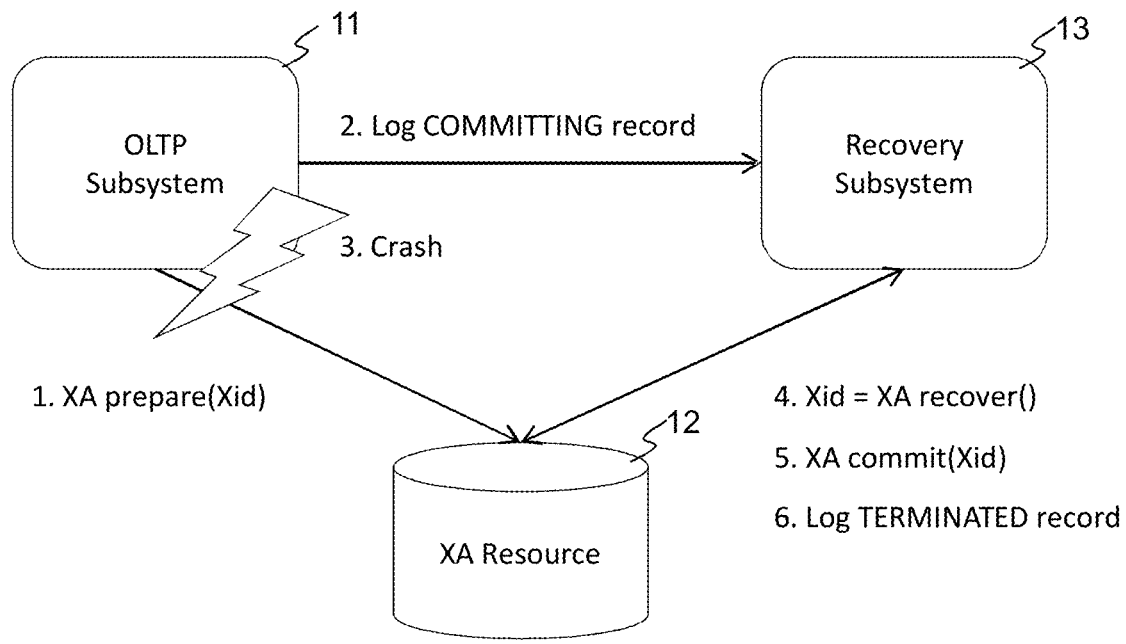
FIG. 5 recovery with a committing entry: replay commit.

If the OLTP subsystem disappears after logging a COMMITTING record, then one or more resources may not have received the commit instruction yet. In these cases, the recovery subsystem has to "replay commit" in order to notify these resources. This is shown in FIG. 5.

The recovery subsystem does this as follows (steps 4 and later in the figure):

1. It asks the resource for any pending transactions (step 4 in the figure).

2. For each Xid with a pending COMMITTING record, it performs XA commit on the resource (step 5 in the figure).

3. If there are no pending Xids left for the transaction with the COMMITTING record, then the recovery subsystem logs a TERMINATED record (step 6 in the figure).

Note that it is the process of commit replay (i.e., committing and terminating based on a particular Xid found in the resource) that eventually allows recovery to forget about a particular COMMITTING log entry.

How Xid/Resource Availability Drives Recovery

Suppose there exists a committing log entry for a transaction tx1 that spans two resources ("resource1" and "resource2"). Then the log entry would contain two Xids: Xid1 and Xid2 (one for each resource). Recall that each Xid comprises a recovery domain identifier. The log entry would look like this (simplified, with only relevant parts shown):

TransactionId=tx1
Xid=Xid1,resourceName=resource1,
    state=COMMITTING
Xid=Xid2,resourceName=resource2,
    state=COMMITTING
ResultingState=COMMITTING
Expires=1211114344434343

The recovery system will regularly perform scans across all known resources. This means it will attempt to create a connection to the resource and retrieve all or some pending Xids for its recovery domain. (Note: for each resource, the recovery system knows how to connect and it also has access to the unique resource name used for the resource.)

Replaying Commit of Xid1

Suppose Xid1 is found during the recovery scan. Based on the log entry, recovery decides to replay commit of Xid1. When this succeeds, the state of Xid1 in the log entry is updated to TERMINATED:

TransactionId=tx1
Xid=Xid1,resourceName=resource1,
    state=TERMINATED
Xid=Xid2,resourceName=resource2,
    state=COMMITTING
ResultingState=COMMITTING
Expires=1211114344434343

Nothing else changes, because there is still Xid2 to commit. So the ResultingState of the log entry remains COMMITTING.

Replaying Commit of Xid2

Suppose now the same (or a later) recovery scan discovers Xid2. Similarly, it will replay commit and update the log:

TransactionId=tx1
Xid=Xid1,resourceName=resource1,
    state=TERMINATED
Xid=Xid2,resourceName=resource2,
    state=TERMINATED
ResultingState=TERMINATED
Expires=1211114344434343

Not only did this update the state of Xid2, it also marked the entire log entry's ResultingState as TERMINATED so it can be garbage collected.

Note that it is not necessary to log the fact that the Xids are terminated individually, but only that the global TransactionId=tx1 is. Or one can use the fact that each Xid contains the global transaction ID and the branch ID. Thus, the global transaction being terminated also comprises the information that the Xids have been terminated.

An Xid can comprise the recovery domain, as part of the global transaction ID or GTID, or as part of the branch qualifier. For example, Xid1=GTID, orderprocessing.server1, . . .
Xid2=GTID, orderprocessing.server2, . . .

wherein the branch qualifiers are "orderprocessing.server1" and "orderprocessing.server2", with "orderprocessing" being the recovery domain identifier.

This illustrates how recovery can be driven entirely by the discovery of Xids to recover, and indirectly, by the availability of a resource to be recovered.

Optimizations of Recovery

Cleanup of Dangling Commits

In some cases, the recovery subsystem will have dangling COMMITTING records for transactions that are no longer known to any XA Resource.

Figure 6:
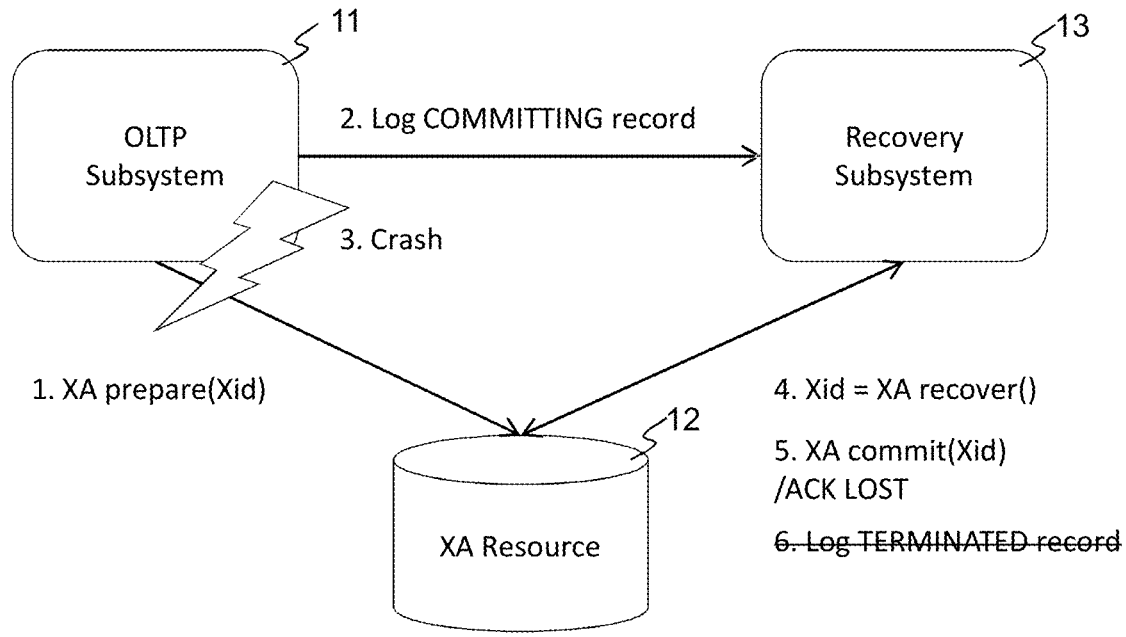
FIG. 6 recovery with dangling commits.

For instance, one case where this happens is show in FIG. 6: while replaying a commit, a communication failure may lead to a lost acknowledgment in step 5, along with an exception. For all the recovery subsystem knows, the Xid may still exist in the resource so it does not log a TERMINATED record.

However, if the resource did actually perform the commit of step 5 (and if the communication failure happened while sending the acknowledgment to the recovery subsystem) then the resource will not remember the Xid any more, and will never return it on later recovery scans. This means that the recovery subsystem will not be able to forget about the transaction (because the COMMITTING record will stay around as shown in the previous section).

To allow the recovery subsystem to cleanup such transactions, it may resort to using a "unique resource name" for each XA Resource it knows about. Each of the Xids in its log records also has this unique name of the resource associated with it (and the OLTP subsystem is again responsible for logging this name as part of the log entry it sends to the recovery subsystem). In the previous section, this was shown in the example log entry as the "resourceName".

When the recovery subsystem interrogates a XA Resource for which it has a COMMITTING Xid (as determined by the unique resource name in the log entry) but the XA resource does not return that Xid, then the recovery subsystem may safely assume that the entry does not have to be kept as far as that XA resource is concerned. This helps cleaning up pending log entries.

Dealing with OLTP—Recovery Race Conditions

In some cases there is a race condition between OLTP and recovery, most notably when recovery acts very shortly after preparing the transaction.

Interference Between Presumed Abort and OLTP Commit (1)

Figure 7:
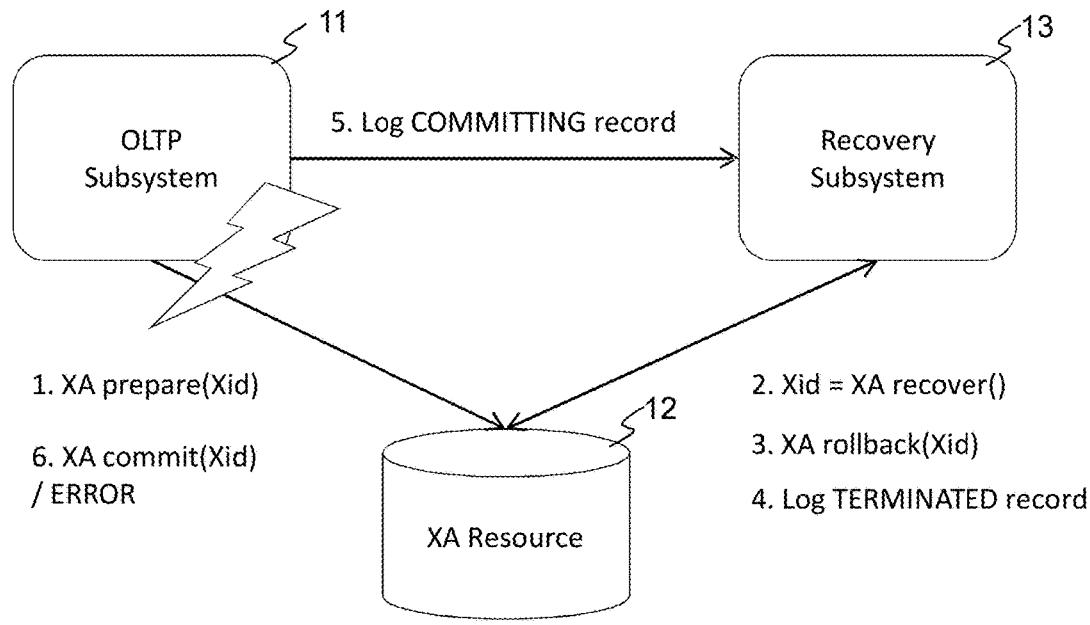
FIG. 7 recovery with OLTP commit interference.

As can be seen in FIG. 7 the problem happens like this:
1. The OLTP subsystem prepares the Xid in the resource with the intention of committing.
2. Before OLTP commit proceeds, the recovery subsystem starts a recovery scan.
3. Recovery finds the Xid and sees no COMMITTING record, so it performs "presumed abort".
4. The recovery subsystem entirely forgets about the transaction (and Xid) by logging a TERMINATED record.
5. Now, OLTP commit proceeds with logging a commit record. Because the recovery subsystem has already forgotten about the transaction (as per the previous step), it sees no issues.
6. Finally, OLTP commit proceeds in the resource, but the resource no longer recognizes the Xid from step 1 and fails to commit.

To fix this problem, the following solution can be implemented: both the recovery subsystem and the OLTP subsystem are aware of a "maximum transaction timeout" configuration setting called "MTT" here for convenience. This timeout is checked at runtime via the recovery subsystem API—called by the OLTP subsystem—to ensure that the OLTP system does not use timeouts that exceed this value. MTT can be expressed in any time unit, typically seconds or milliseconds.

To the OLTP system, the MTT means the following: when it starts a transaction, it will no longer attempt to commit it after a delay of at most MTT. This limiting delay is called the transaction timeout (and this means that transactions will always rollback when they exceed this timeout). Whenever the OLTP subsystem logs a COMMITTING record via the recovery subsystem API it incorporates the transaction timeout in the form of an (absolute) expiration date-time for the transaction. The recovery subsystem will then validate this expiration timestamp against its system time and reject the COMMITTING record if already expired.

To the recovery subsystem, the maximum transaction timeout means that it will wait at least for a delay of MTT before attempting to rollback in step 3. More precisely: when first detecting the Xid in step 2, the recovery subsystem will delay presumed abort to a later recovery scan. In fact, it will only perform step 3 at least after a delay of MTT has passed since the Xid was retrieved for the first time by step 2, and only if the Xid is still present in the resource after that time.

Figure 8:
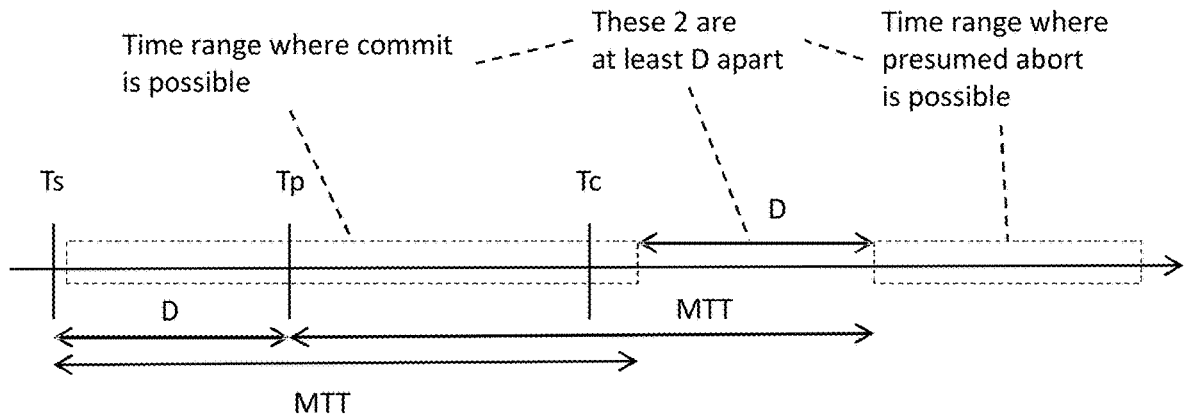
FIG. 8 maximum transaction timeout (MTT)

It should be clear that this collaborative use of timeouts by both OLTP and recovery will avoid the illustrated interference between OLTP commit and recovery, because only one of both would happen: either step 5 happens within the MTT delay, or step 3 happens after that—but not both. This is shown on the time axis in FIG. 8.

Interference Between Presumed Abort and OLTP Commit (2)

The previous solution requires that presumed abort wait for at least as long as the longest transaction in the system. This can be problematic for particular configurations that use long transactions: if OLTP requires 1 hour to execute, then all system recovery with presumed abort will be forced to wait at least 1 hour. This can be too long to be practical.

A different but similar solution is the following:

Before OLTP starts prepare, it determines an expiration time for commit, i.e. a maximum timestamp for Tc. It does this by adding a maximum delay $D_{2PC}$ to the OLTP clock time (before it does the first prepare) and using this time as the expiration of the committing log entry.

The recovery system is aware of $D_{2PC}$ and waits at least the same delay before it starts presumed abort. Because of possible clock drift between the OLTP and recovery subsystems, a little extra delay is probably desirable.

Figure 9:
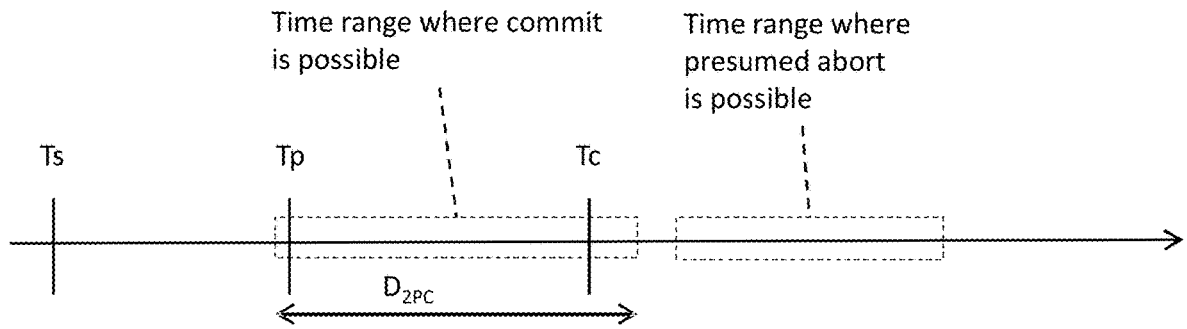
FIG. 9 maximum delay between transaction prepare and commit (D2PC)

This also prevents the interference problem, as show in FIG. 9.

In summary, conflicts between a commit and a presumed abort are avoided by delaying the presumed abort.

Interference Between Presumed Abort and OLTP Commit (3)

The previous two solutions can be generalized in the following scheme:

The OLTP subsystem determines a maximum expiration timestamp for the COMMITTING log record.

The recovery enforces this expiration by refusing to log a COMMITTING record if it has expired.

The OLTP subsystem may optionally also refuse to request the logging of a COMMITTING record after it has expired.

The OLTP subsystem may optionally verify that the request of the logging of a COMMITTING record has been accepted by the recovery subsystem. If it has not been accepted, then the OLTP subsystem should not issue a COMMIT to the resource subsystem.

When the recovery subsystem finds a prepared Xid, it is able to infer a delay after which any future COMMITTING record will have expired.

Without loss of generality, the recovery subsystem could infer this delay via a shared parameter such as MTT or $D_{2PC}$ in the above discussions.

Interference Between Commit Replay and OLTP Commit

In a similar way, it is possible for recovery to replay commit before OLTP commit happens, giving similar errors in OLTP commit as in the previous case. Although less severe (in this case, there is no mixed outcome of recovery trying to abort and OLTP trying to commit), this can be confusing to the application developers and the operations team. The solution to this is to allow for some time for the OLTP commit to happen gracefully, before commit replay is done. This is done by adding a delay before attempting the commit replay. In practice, the commit replay can be made to only happen after the transaction expires—as indicated by the expiration timestamp in the log entry.

Disaster Recovery

We conclude with a section on how to deal with disaster recovery in specific architectures like in FIG. 11.

Disaster Scenario: Sudden and Permanent Loss of the Primary DBMS

All (ongoing) requests' transactions are in one of the following states:

1. Committed in both DBMS: the secondary will have a backup copy ready without any additional effort.
2. No committing record in the recovery subsystem yet: these transactions will be rolled back in the secondary by presumed abort (if present at all).
3. Committing record in the recovery subsystem but not yet committed in the secondary DBMS: these transactions will replay commit in the secondary by the recovery subsystem.

It should be clear that the secondary DBMS will have all the committed records of the primary DBMS after at most the time required for the secondary DBMS to undergo "replay commit" and "presumed abort".

The following steps are performed to allow the system to perform this recovery, and to reconstruct a new primary DBMS based on the secondary DBMS:

1. The system is temporarily put into read-only mode until two DBMS are available again. This also gives recovery a time to do its work. During this time, any incoming client updates are rejected.
2. The former primary DMBS' pending Xids have to be purged from the transaction logs since they will no longer be found in the new primary.
3. Recovery is allowed to terminate on the secondary DBMS before the new primary is reconstructed. This is necessary to allow all pending transactions to terminate without leaving any pending transaction locks (since prepared transactions keep their locks).
4. A new primary DBMS is now constructed by taking a copy or dump of the (now quiescent) secondary DBMS.

In embodiments wherein the recovery subsystem is based on the DBMS log, step 2 is not required, since no logs are present to be deleted.

Disaster Scenario: Sudden and Permanent Loss of the Secondary DBMS

This can be handled in a similar way as the previous case by switching the role of the primary and secondary DBMS.

Disaster Scenario: Sudden and Permanent Loss of the Transaction Log File(s)

The loss of the transaction log files should be avoided by using stable redundant storage as much as possible. However, under certain assumptions the log files can be reconstructed based on the XA resources alone:

Assumptions

1. Transactions are either read-only, or they update all the resources in the system.
2. XA prepare happens in a well-defined consistent order across all resources. This order is the same for all update transactions. E.g., "first" the primary DBMS is updated, and then "second" the secondary DBMS is updated.
3. XA commit is done in the same order as XA prepare. This applies both to operation of the OLTP subsystem 12 and the recovery subsystem 13.
4. XA rollback is done in the reverse order. This applies both to operation of the OLTP subsystem 12 and the recovery subsystem 13.

These assumptions apply to the primary/secondary DBMS scenario, but can apply to other scenarios as well. The main point is that the transactions update all the resources of an ordered set of resources, and the order in which the prepare in the two or more resources takes place is always the same order, and is the same as the order of committing, and is the reverse of the order of rollback, and is known when reconstructing the log records.

The following procedure works independently of how the recovery subsystem 13 is implemented, or even if there is no recovery subsystem 13 at all. In other words, it can be implemented in system architectures other than that of the FIG. 1 or 2.

Reconstructing the Log Records

The log is reconstructed by essentially reconstructing the COMMITTING log records at the time of the loss of the transaction logs.

Assuming the resource order mentioned before, the following shows how to reconstruct the logs. See the illustration in FIG. 12):

Any global transaction id (GTID) for which a Xid is found in the first resource but not in the second can be rolled back because it outrules any commit decision in the past.

Any GTID for which a Xid is found in the second resource but not in the first can be assumed COMMITTING and a corresponding transaction log record can be persisted in the log files.

Any GTID that is found in both resources can also be assumed COMMITTING and a corresponding transaction log record can be persisted in the log files.

High Availability Transaction Log

If the recovery subsystem, as presented so far, is implemented as a networked service accepting log requests, then this service needs to be highly available. Furthermore, if the recovery subsystem logs to a file system then it still needs to have reliable access to the file system, which is not trivial in a cloud infrastructure.

Many cloud environments offer access to a DBMS server with high availability. By logging directly to the DBMS (via, say, JDBC) the need to set up a highly available network service for the recovery subsystem can be eliminated. This takes at least some burden away from the recovery subsystem: it still needs to be available for recovery, but not as much as before. A DBMS typically needs a file system for storage. By reusing an existing DBMS for logging, the separate need for file storage on or for the recovery subsystem nodes can be eliminated.

Figure 13:
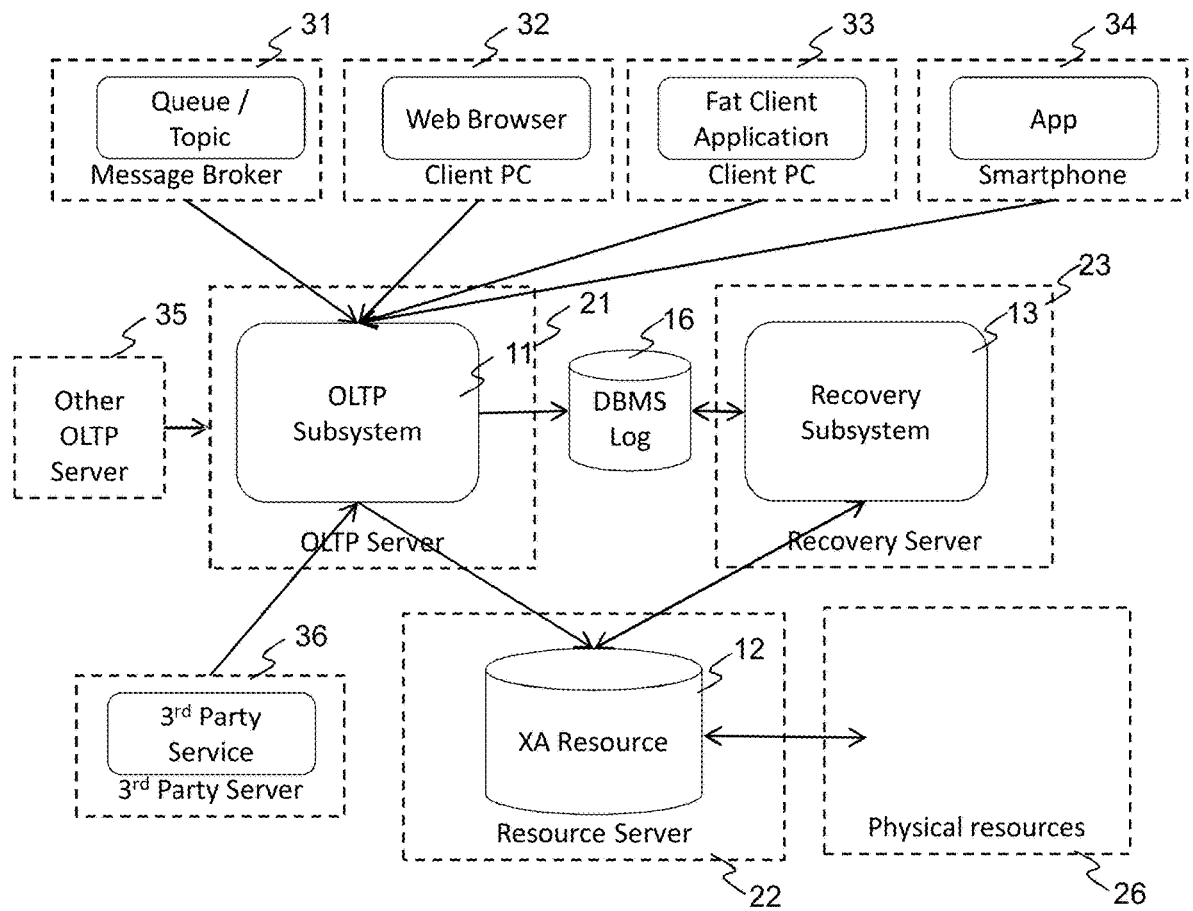
FIG. 13 system architecture using a DBMS log.

FIG. 13 shows a structure analogous to that of FIG. 1, but with a DBMS based log, also called "DBMS log" 16 for brevity, instead of the recovery storage 25 with log file 15.

This leads to differences with regard to certain aspects presented so far:

The DBMS log 16 is now the interface to the OLTP subsystem 11, so the recovery subsystem 13 has less control over what can be stored in the DBMS log 16. The recovery subsystem 13 can no longer validate the incoming records as much as in the previous embodiments.

For the same reason, the recovery subsystem 13 cannot easily refuse expired COMMITTING records: it has no more control over them. So smart use can be made of JDBC-level timeouts, so a driver of the DBMS log 16 can be configured to cancel OLTP log requests that exceed the expiration of any COMMITTING records being logged.

There are extra performance concerns due to network delays, because every OLTP subsystem 11 and also every recovery log operation now need to go to a separate DBMS log 16 server. As a solution, batched operations can be used, that is, operations in which multiple requests are sent together, as a batch or set, to a DBMS log 16, at the same time. This can be done in one go, as opposed to sending multiple separate requests at different times. However, batched operations are only an option, multiple separate requests can be used as well, depending on circumstances.

For the same reason, access to the DBMS log 16 should be avoided whenever possible. This can be implemented by the OLTP subsystem 11 no longer logging TERMINATED records and the recovery subsystem having a cache for performing presumed abort. As a result, presumed abort itself will not require log access to the DBMS log 16.

In the following, the operation of the using the DBMS log 16 is presented, with reference to FIGS. 13-17.

OLTP Commit: the Happy Path

Figure 14:
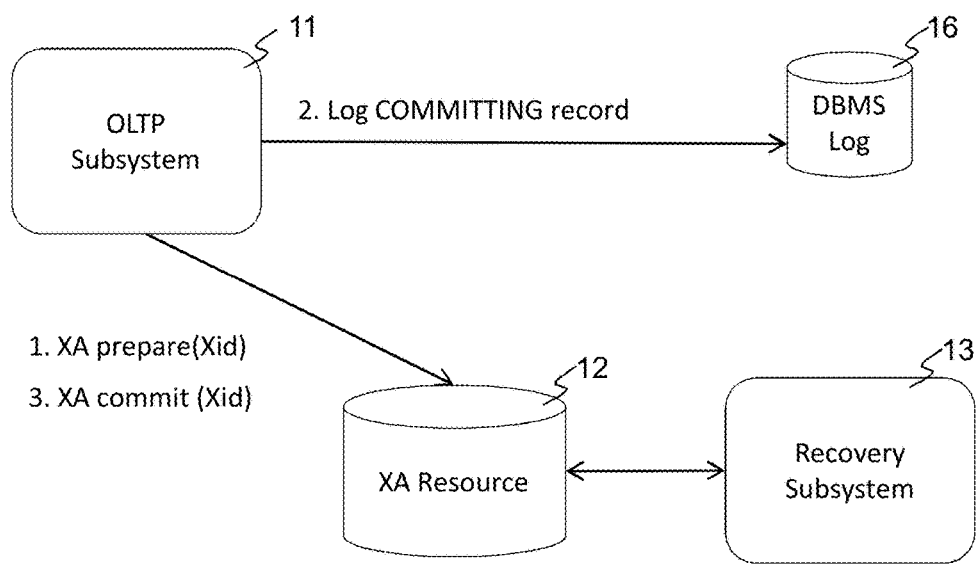
FIG. 14 OLTP commit: the happy path using the DBMS log.

FIG. 14 shows the process under ordinary conditions, using the DBMS log 16: The COMMITTING records are logged (for example batchwise) by the OLTP subsystem 11 directly into the DBMS log 16 used by the recovery system 13. No TERMINATED records are logged by the OLTP subsystem 11. The recovery subsystem 13 takes care of termination, as will be detailed later on.

Simplified Log Record Structure

The log records can be simpler in this design, both to minimize OLTP logging issues and to avoid unnecessary DBMS updates. Log records no longer necessarily contain XIDs or XID-specific state. At a minimum. only the global transaction ID, the state (COMMITTING in most cases) and the expiration is required. For example, the log entry would look like this (simplified, with only relevant parts shown):

TransactionId=tx1
ResultingState=COMMITTING
Expires=1211114344434343

This means that recovery will not have to update individual XID states in the log.

Optionally, the log entry can comprise unique resource names identifying the resources used by the transaction.

resourceName=resource1
resourceName=resource2

Because the typical relational DBMS is not a map store, logging TERMINATED records typically corresponds to or is equivalent to the physical deletion of log records. In other words, each call to the DBMS log 16 labelled "Log TERMINATED record" can be labelled "Delete previously stored COMMITTING record". Typically, the record is specified by its global transaction ID. Of course, based on the technologies used (like No-SQL databases) the map analogy may still hold.

How Recovery Works

Figure 15:
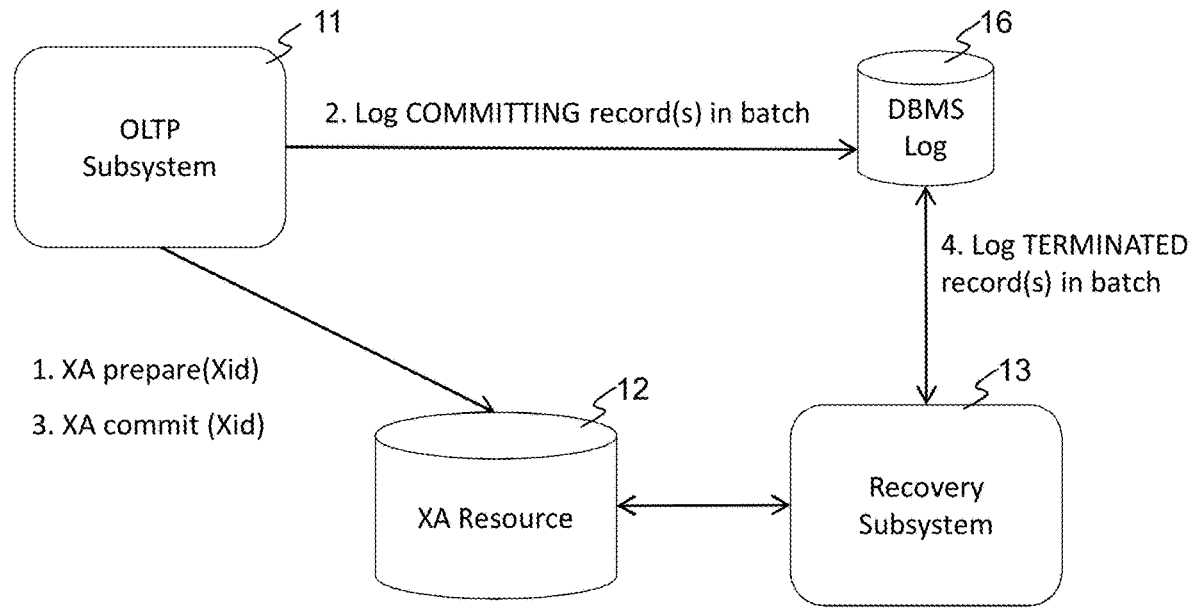
FIG. 15 batch wise logging to the DBMS log.

Recovery can be redesigned to be more of a batch-oriented process. This can avoid unnecessary network delays to and from the DBMS log storage. FIG. 15 shows on the one hand batch wise logging of COMMITTING records by the OLTP subsystem 11 and batch wise logging of TERMINATED records by the recovery subsystem 13. In principle, COMMITTING records are inserted exclusively by the OLTP subsystem 11, and TERMINATED records are logged—e.g. by means of deleting records—exclusively by the recovery subsystem 13.

However, the fact that the OLTP subsystem 11 no longer logs TERMINATED records means that recovery now has more cleanup to do.

In particular, the recovery subsystem has to delete COMMITTING records sooner or later, or the log will keep growing. To understand when this is possible, recall why the COMMITTING records are kept in the first place: they are used to replay commit if one or more XIDs of that particular transaction are found pending in the resource. As explained in the description of the first embodiment, using the file based logging subsystem 15, the recovery subsystem will only do this if two conditions hold:

1. The XID is found pending in the resource (during recovery) and
2. An expired COMMITTING record is found for the transaction.

If a matching XID is found then recovery will commit that XID in the corresponding resource. If there are no errors then the XID will no longer be pending in that resource, so subsequent recovery scans will no longer find it pending.

Presumed Abort

Figure 16:
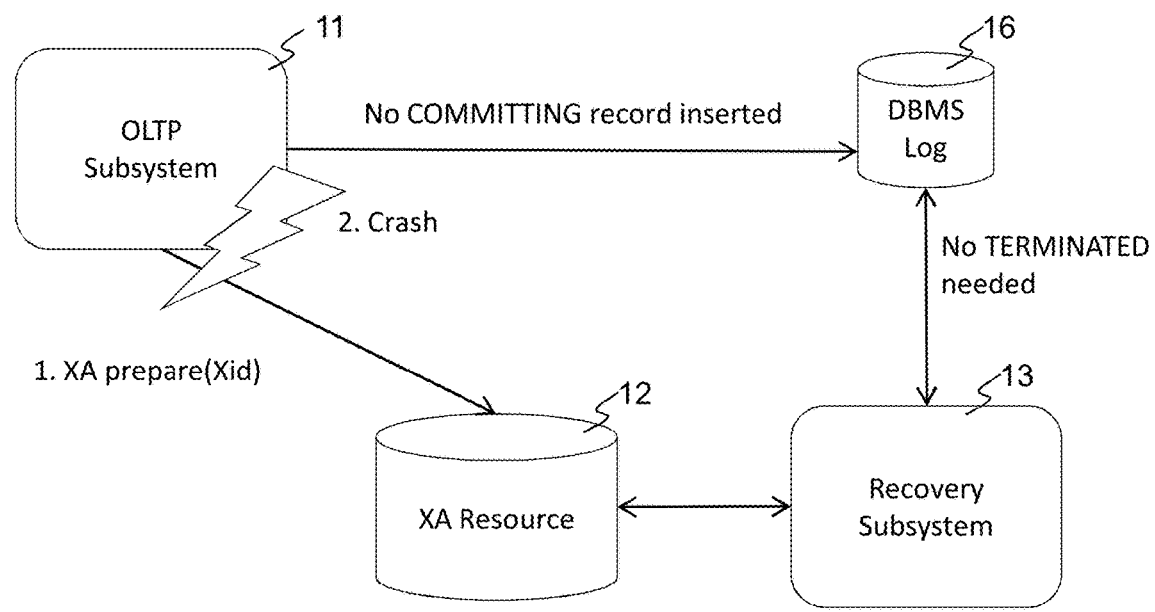
FIG. 16 presumed abort using the DBMS log.

FIG. 16 shows the steps leading to a presumed abort. The situation and the procedure is analogous to that of FIG. 4, but the DBMS log 16 is used. After the first step, the OLTP subsystem 11 crashes and no COMMITTING record is logged. During recovery, the recovery subsystem does the following:
1. It interrogates the XA Resource to find any dangling prepared transaction (identified by the global transaction ID). This is step 3 in FIG. 16.
2. If there is no corresponding COMMITTING record for this global transaction ID, the recovery subsystem will typically opt to rollback ("presumed abort"). This is shown as step 4 in FIG. 16.

It is not necessary to mark the transaction as TERMINATED (as opposed to step 5 in FIG. 4).

Commit Replay

Figure 17:
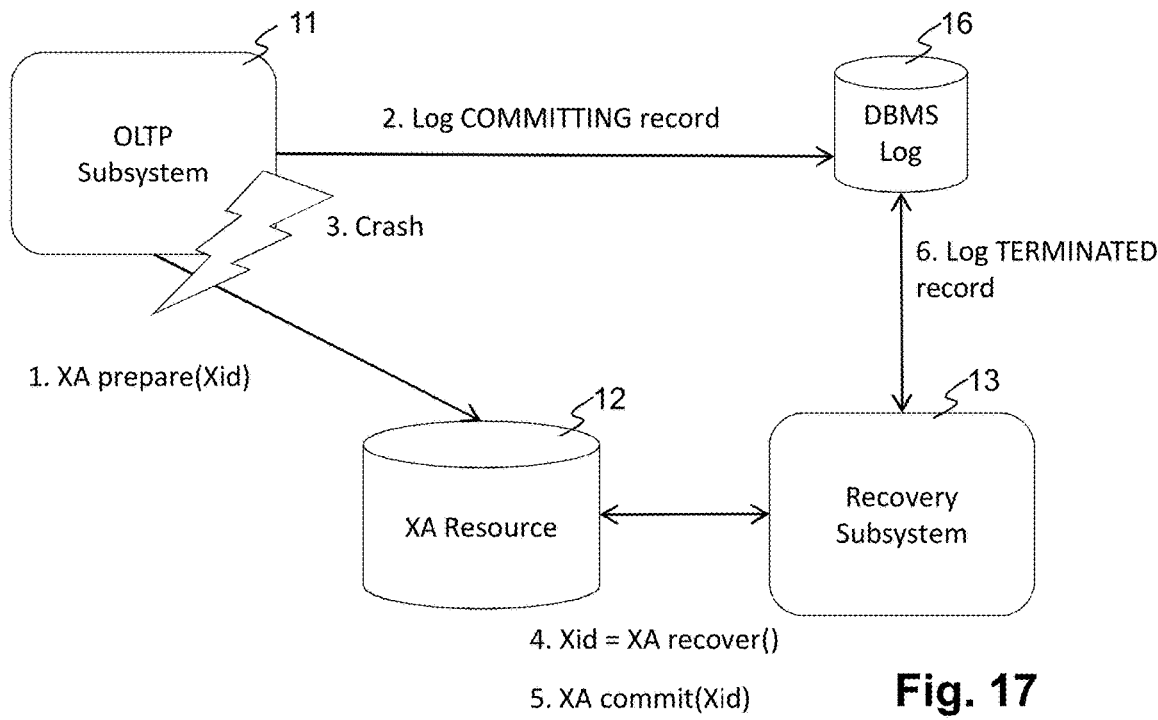
FIG. 17 replay commit using the DBMS log.

FIG. 17 shows the steps leading to a commit replay. The situation and the procedure is analogous to that of FIG. 5, but the DBMS log 16 is used. After logging a COMMITTING record to the DBMS log 16, the OLTP subsystem 11 crashes The recovery subsystem 13 does this as follows (steps 4 and later in the figure):
1. It asks the resource for any pending transactions, identified by the global transaction ID (step 4 in the figure).
2. For each global transaction ID for which a corresponding pending COMMITTING record exists in the DBMS log 16, the recovery subsystem 13 performs XA commit on the resource (step 5 in the figure).
3. If there are no uncommitted XA resources left that have a global transaction ID corresponding to a transaction with the COMMITTING record, then the recovery subsystem logs a TERMINATED record to that global transaction ID (step 6 in the figure).

Termination Handled by Recovery

Summarising the above it can be said: expired COMMITTING records for which there are no pending XIDs (which contain the global transaction IDs) in any resource will no longer be needed. This is because there will be no need to replay commit. The association between the COMMITTING records and the pending XIDs is done by means of the global transaction ID, which is found both in the transaction log and the XIDs.

Furthermore: if an expired COMMITTING record exists at the start of recovery and recovery goes well, then there will be no pending XIDs (with associated global transaction IDs) left for the transaction in question.

The conclusion is that the recovery can safely delete those records. Of course, this is only safe if:
1. All resources were available during the last recovery scan, and
2. There were no errors during recovery of those resources Dealing with OLTP—Recovery Race Conditions Interference between presumed abort and OLTP commit takes a bit more care due to the direct logging by the OLTP subsystem 11 into the shared DBMS log 16: the recovery subsystem 13 has no control any more over what makes it to the DBMS log 16. By the time a COMMITTING record is stored, it may have expired already—and presumed abort may have been performed by recovery. This is to be avoided.

The problem can be solved by OLTP logging working, for example, via JDBC (Java Database Connect) drivers—a standard way of issuing SQL commands to a DBMS. These drivers offer a functionality called "query timeout": a timeout that can be set for any SQL command, and if this timeout expires before the DBMS confirms then the driver cancels the command. One can rely on this functionality to choose smart timeouts: for any batch of SQL inserts (comprising COMMITTING records): the expiration of the batch is set to the earliest expiration of any transaction in the batch. The same can be done if separate inserts instead of batches are used.

This way, no COMMITTING record can ever make it to the DBMS log 16 after its expiration and this protects against interference between commit and presumed abort: it is not possible to commit a transaction after its expiration—i.e., in the time window where presumed abort can act.

Consequently, conflicts between a commit and a presumed abort are avoided by eliminating the commit.

In principle this technique works for any of the timeout/delay strategies presented in the first embodiment.

Transaction Event Bus

Figure 18:
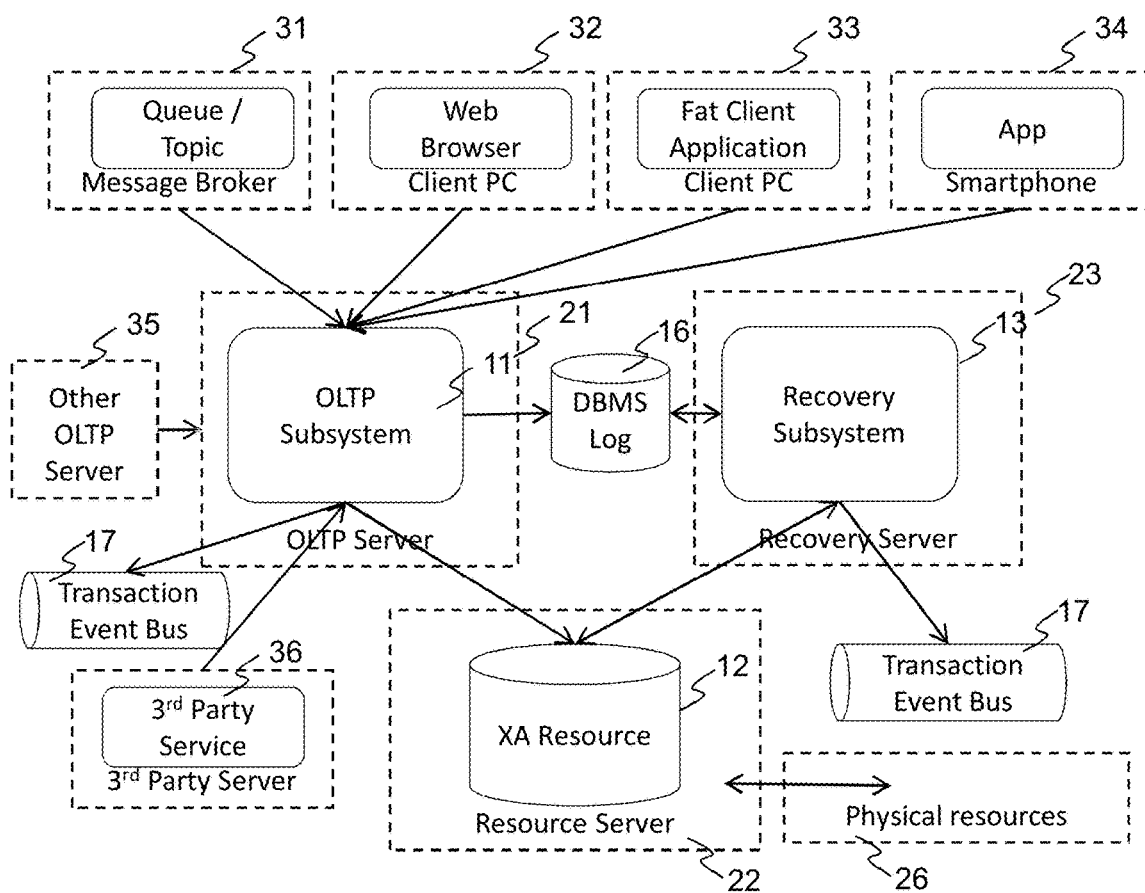
FIG. 18 system architecture comprising a transaction event bus.

FIG. 18 shows the system discussed so far, with the addition of a transaction event bus 17.

In any normal two-phase commit system there is the possibility of unilateral commit or rollback by any XA Resource. This will typically happen when a transaction remains prepared for too long, so the resource decides to terminate it either way via commit or rollback. Subsequently, when recovery attempts to replay a commit, it may find that the resource has performed rollback. Likewise, an attempt to rollback during recovery may find that the resource has done a commit instead.

These are known as "heuristic exceptions" and lead to alerts during recovery. Other than that, there is little that can be done by the transaction system: assessing the impact is mainly an application-level task to be done by the operators of the system. In order to do this, operators typically need some context information about the transaction (what did it do, in what resource, so what has to be done to repair an acceptable outcome and so on).

Our system offers the possibility of recreating the required context after a heuristic outcome is reported by the transaction system, as follows:
Whenever a transaction starts preparing, the system publishes a "TransactionPreparingEvent" with relevant identifying information such as the global transaction identifier, the names of the resources involved and the XIDs in these resources.
This event can be intercepted by the application, so it can log the event in its log files.
Importantly, the application can add additional information, such as the SQL that was performed and other application-level comments relevant to the transaction. This additional information can also be logged in association with identifying information such as one or more of as the global transaction identifier, the names of the resources involved and the XIDs in these resources—depending on what is available to the application. Typically, the additional information is an SQL statement used when calling the XA resource (see e.g. FIG. 10, Step 2). Although this information is implicitly known in the XA resource, there is no easy way to extract it from the XA resource. In other applications, for example, a messaging application, the additional information is the content of a message sent to a XA resource that is a message broker.
Whenever there is a heuristic outcome, the transaction system publishes a similar "TransactionHeuristicEvent" containing the same identifying information such as the global transaction identifier and the XID(s) in question, etc.

The application can intercept such heuristic events and also log them.

In embodiments, the TP subsystem can publish "ResourceAccessedEvent" events whenever the transaction accesses an XAResource. These events can contain the global transaction ID, and the SQL statement (for a DBMS) or message text (for a message broker).

The net effect is that there is a log file that contains all relevant information to assess the business impact of heuristics and/or allows for an operator to manually clean up the situation.

The terminology used here is related to the publish-subscribe communication paradigm or messaging pattern: In software architecture, publish-subscribe is a messaging pattern where senders of messages, called publishers, do not program the messages to be sent directly to specific receivers, called subscribers, but instead categorize published messages into classes without knowledge of which subscribers, if any, there may be. However, other messaging patterns can be used as well.

In summary,
both the TP subsystem and the recovery subsystem communicate events to the application (for example, using the transaction event bus, for example, using the publish-subscribe mechanism);
the application receives and logs these events;
the application (optionally) logs additional information about its own operation.

Taken together, the logged events and additional information, including associated Xids and global transaction IDs and the state of the XA Resources (e.g. prepared, committed transactions) and the state represented in the recovery subsystem allow, in the event of a failure that cannot be handled by the system, a human administrator to clean up the situation, that is, to bring the resources and applications into a valid and consistent state.

The transaction event "bus" can be a an event bus in the style of, for example, the well-known Google Guava event bus (github.com/google/guava/wiki/EventBusExplained)

Basically, it is a way for independent application-level "plugins" to register with the core of the transaction service in order to receive callback notifications on significant events.

Technically speaking, registration can be done by the transaction core looking up implementations of its callback interface ("EventListener") in the runtime classpath of a Java virtual machine running the transaction core. (in general, the callback mechanism allows passing an interface reference that refers to a known function to the transaction core. Then it is possible to call and use that function from the transaction core). This allows registration of independent implementation plugins without the transaction core being aware of the implementation details.

One of the main uses of this mechanism is to allow for application-specific logging activities to enrich specific transaction-related events with additional contextual information.

Of particular interest is the utility of this mechanism in resolving transaction outcome anomalies like heuristic exceptions (i.e., cases where the transaction outcome is not well-defined). For clarity we propose the following example, in the context of the replication architecture of FIG. 11:

Example: Database Replication

Imagine the database replication scenario of FIG. 11. The following is a typical way of dealing with this by use of the event bus:

1. The application developers/administrators register event listeners for the TP subsystem (to receive TransactionPreparingEvent callbacks) and the recovery subsystem (to receive TransactionHeuristicEvent callbacks). This typically happens at system configuration time.
2. Before calling prepare on each resource (i.e., between steps 7 and 8 in FIG. 11) the transaction core notifies the registered event listeners of a TransactionPreparingEvent indicating the global transaction id of the transaction being prepared. Other, optional information about the transaction may be included as well—such as resource names and/or XIDs.
3. The application's event listener implementation now has the option to extend/enrich the information contained in the TransactionPreparingEvent with additional, application-specific information related to the transaction—such as what SQL commands it has been performing in each database. The application may choose to log this to a log file of its own choice.
4. After steps 8 and 9 (i.e., the prepare of FIG. 11) there is a crash. Steps 11 and 12 will now be delegated to the recovery subsystem.

For the sake of this example, imagine that the recovery subsystem fails to reach the primary DBMS for some extended time period. When it finally replays the commit there, it receives a heuristic exception because the primary DB's DBA (a human database administrator) has already forced an internal rollback of the pending prepared transaction.

To see how the event mechanism helps during the treatment of heuristic anomalies, let's consider what happens next:

1. The recovery subsystem notifies the registered event listeners of a TransactionHeuristicEvent along with the global transaction id involved, and optionally the XID and/or the resource name.
2. The application-level event listener implementation may now choose to log this in its application log files, possibly with additional context information it may hold.

In FIG. 11, the replication architecture can use the transaction event bus to log the following:

Between steps 7 and 8 the transaction core of the OLTP subsystem generates a TransactionPreparingEvent. This is captured by an application-level event listener and logged like this:
TransactionPreparingEvent for transaction with id: b84c9b51
XID: b84c9b51:3139322E746D31
in resource: PrimaryOrderDBMS
XID: b84c9b51:3139322E746D32
in resource: SecondaryOrderDBMS Moreover, the application has memorised what SQL was executed, in which resource, and enriches the log with the following:
SQL in resource PrimaryOrderDBMS: INSERT INTO ORDERS (ORDER_ID, ITEM_ID, AMOUNT) VALUES (121, 353432, 10)
SQL in resource SecondaryOrderDBMS: INSERT INTO ORDERS (ORDER_ID, ITEM_ID, AMOUNT) VALUES (121, 353432, 10)

Now suppose that commit fails to reach the SecondaryOrderDBMS for a while, leading to a heuristic abort by the SecondaryOrderDBMS. The recovery subsystem detects this and generates a TransactionHeuristicEvent. In much the same way, this event is captured by an application listener and logged as follows:

Heuristic abort of XID: b84c9b51:3139322E746D32 for transaction: b84c9b51

Manual intervention is now possible: based on the XID of the heuristic abort (b84c9b51:3139322E746D32)

For this, the operators can trace the abort back to the insert in the SecondaryOrderDBMS and could opt to redo the SQL:

INSERT INTO ORDERS (ORDER_ID, ITEM_ID, AMOUNT) VALUES (121, 353432, 10)

As a result, the application log files now contain information covering both the active SQL phase of the transaction (before prepare) as well as the heuristic outcome (during/after recovery). This log file information can be used to reconstruct a global picture of the transaction context and the impact of the heuristic exception on the global outcome—as well as possible compensation remedies. For instance, a human database administrator may use this information to manually replicate the intended information from the other replica database—so the replication state is re-established after this failed transaction.

Example: Financial Transaction System:

We want to make sure that a transfer operation on a bank account involves both the update of the account balance and the sending of a deposit message to a collaborating bank. In the same spirit as the example above, we can imagine that the commit of the message fails with a heuristic outcome—thereby effectively updating the account balance but without actually sending a message to the other bank. The human administrators can use the application log data to manually re-send the message to the other bank so a valid global system state is reconstructed.

Handling Subtransactions

Figure 19:
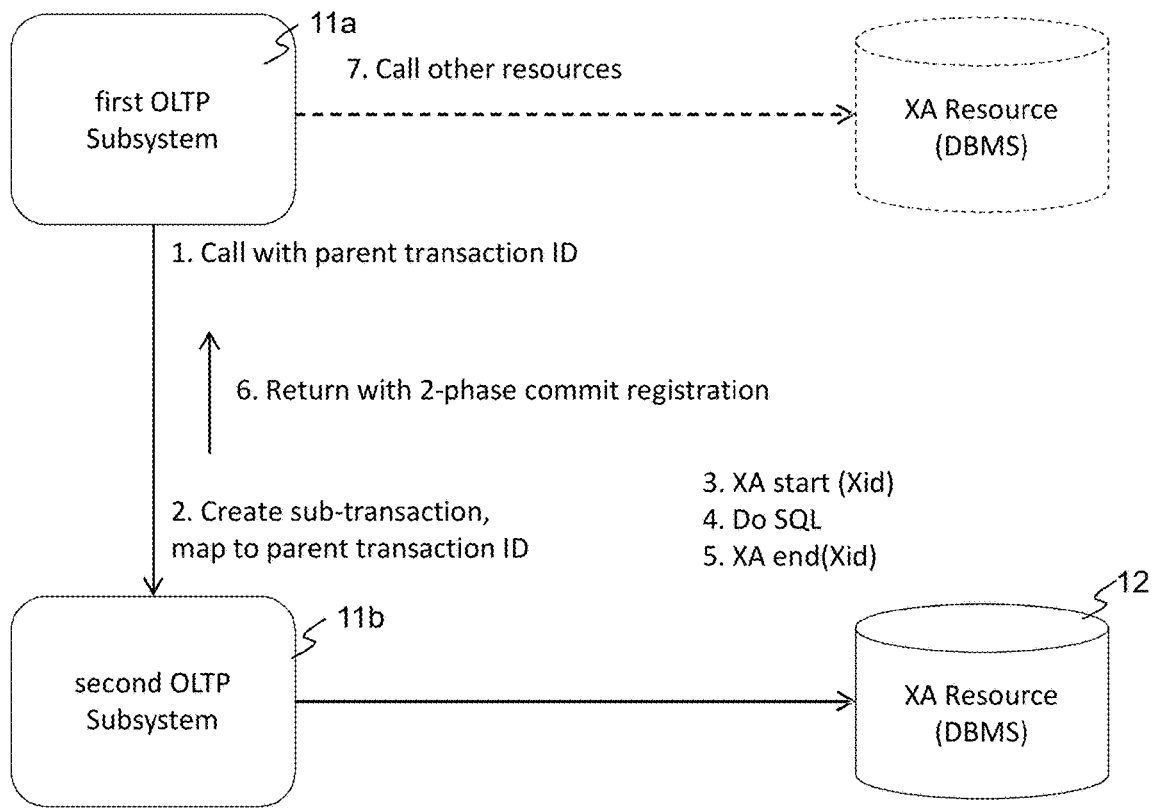
FIG. 19 transaction with sub-transaction.

FIG. 19 shows a situation in which a transaction in a first OLTP Subsystem 11a calls a (sub) transaction from another, second OLTP subsystem 11b. From the point of view of the first OLTP Subsystem, the transaction from the second OLTP subsystem 11b is a sub-transaction. The second OLTP system detects the incoming transaction context, determines that the invocation originates from another transaction, and determines that it should create a sub-transaction. The second OLTP subsystem 11b has its own global transaction ID and Xids.

The latter can be considered to be "local" Xids. Steps 3, 4 and 5 are performed with these local Xids. The XA resource 12 is not aware that the local Xids are parts of a sub-transaction.

Upon recovery, it is necessary to determine parent global transaction ID from the Xids, because the COMMITTING decision will be made at the parent (and logged). During recovery, XIDs for the sub-transaction will be replayed for commit if and only if the parent has a COMMITTING log record. So there needs to be a way to find the parent transaction's log record based on the global transaction ID of the sub-transaction.

This can be done by the second OLTP subsystem 11b logging an INDOUBT record (Step 3) comprising the (calling) parent's global transaction ID and its own (sub-transaction) global transaction ID. For XIDs from the sub-transaction, the recovery system can find this record by the sub-transaction's global transaction ID, and then find the associated COMMITTING record (if any) of the parent.

However, this only works if both the parent transaction and the sub-transaction are logged in the same recovery subsystem. Therefore, the call (1) with the parent transaction ID also contains the unique recovery domain identifier of the first OLTP subsystem 11a. The second OLTP subsystem 11b should reject incoming calls from a different recovery domain. Alternatively, the return value (6) can return the unique recovery domain identifier of 11b for validation by 11a. If the validation is unsuccessful, an error indicating a system configuration error can be raised.

Generally, the return value can comprise information representing application return values and in addition also transaction metadata which can be interpreted by the caller.

How long do these INDOUBT records need to be kept? Since they serve to lookup the presence of a COMMITTING parent record, they need to be kept for as long as a COMMITTING parent can arrive in the system, i.e. until TP timeout value expires.

Handling Failed Remote Calls

A common issue in most transaction technologies like WS-AtomicTransactions is that there is no easy way to detect if a subsystem that receives a remote call, as the second OLTP subsystem 11b does, has respected and recognized the transactional nature of the call. The impact is that there is no way for the first OLTP subsystem 11a to verify if the transaction is indeed handled as a transaction across the first OLTP subsystem 11a and the receiving subsystem 11b or not.

This can be detected and handled in the following manner: if the first OLTP subsystem 11a gets the return value from the call (6) then it checks if it comprises two-phase commit registration information. If not, then the call is considered invalid because the receiving subsystem 11b was not configured to be transactional, and 11a can choose to rollback with no permanent effects on its own resources.

Another common issue is with failed remote calls and retries. If call (1) fails, the first OLTP subsystem 11a can retry the call. However, due the nature of network faults it may be that when the first OLTP subsystem 11a sees a failure, the call 2 at the second OLTP subsystem 11b actually worked but the result (6) got lost underway to the first OLTP subsystem 11a. If the first OLTP subsystem 11a then retries the call, the system may actually commit the work at the second OLTP subsystem 11b twice (once for the assumedly "failed" initial invocation and once for the retry). Without any precautions, the first OLTP subsystem 11a would have to be pessimistic and rollback on all failed calls.

However, safe retries can be implemented as follows: the first OLTP subsystem 11a keeps track of how many remote returns (6) it has received from the second OLTP subsystem 11b. When it prepares the transaction and calls the second OLTP subsystem 11b (step 1 FIG. 20), it includes that count. When the second OLTP subsystem 11b receives the prepare call, it compares the number of calls that the first OLTP subsystem 11a has seen against its own count for the same parent transaction. If there is no match, 11b rejects the prepare—leading to global rollback.

Figure 20:
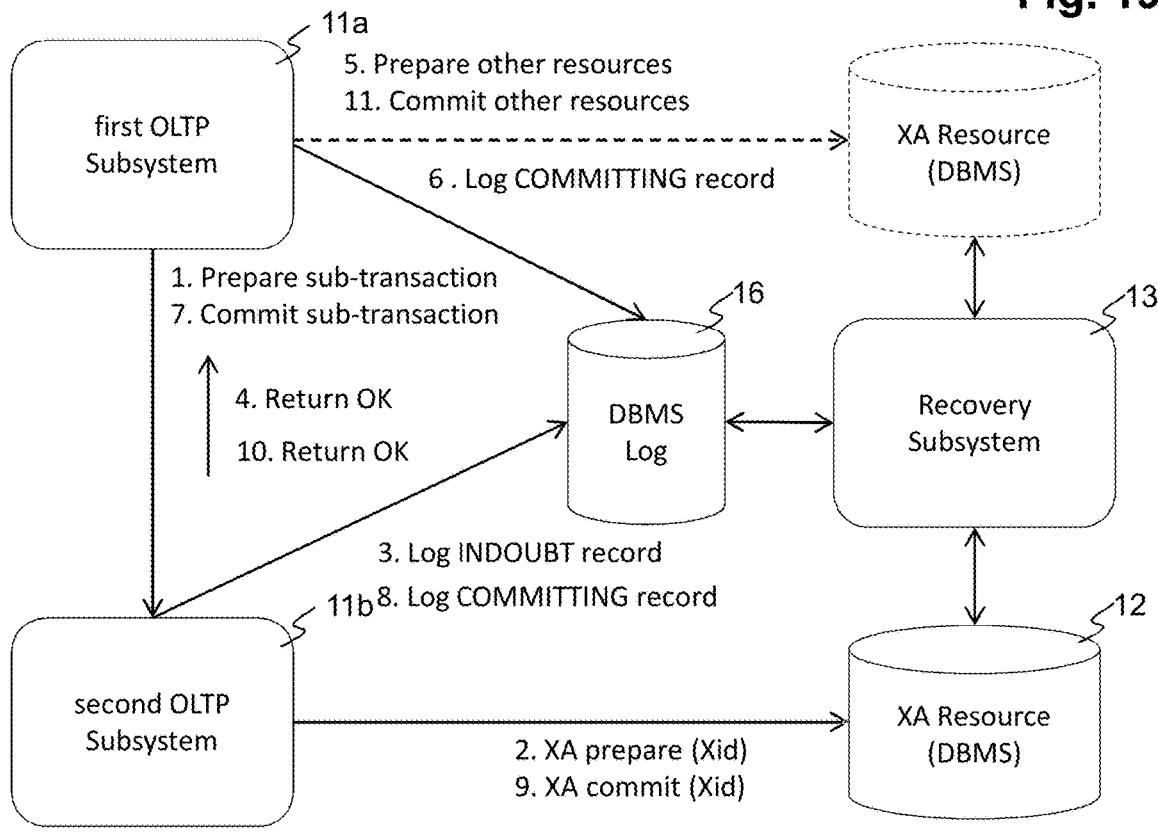
FIG. 20 handling sub-transactions using the DBMS log.

FIG. 20 shows the system of the previous figure, with elements related to logging and recovery added.

Consistent Backups of Multiple XA Resources.

As per the BAC theorem ("When Backing up a microservice architecture, it is not possible to have both Consistency and Availability"), it is generally impossible to have a consistent backup of independent resources in a microservices context. Our DB-based recovery subsystem allows this, as follows:

Each XA Resource can be setup with vendor-specific synchronous replication between a master site A and a failover site B, meaning that all prepared and committed XIDs are present at A and B at the same time.

Our recovery DBMS (or "logging DMBS", comprising the DBMS-based log or simply DBMS log) can equally be setup with synchronous replication across A and B, meaning that all log records are stored at both A and B.

In case of a loss of site A, site B contains a complete replica including prepared XIDs and the transaction log database. This means recovery at B can continue where A left, with zero data loss.

The use of the DBMS based recovery subsystem makes it possible to use existing synchronous replication mechanisms not only for the XA Resources but also for the recovery subsystem. In this way, the complete replication of the entire distributed system can be implemented in a consistent manner. The backup is always in a valid state, or, by the actions of the recovery subsystem, can be brought into a valid state, even with regard to the global transactions.

In a conventional architecture there would be no DBMS log and no recovery subsystem to ensure consistency across the resources.

The invention claimed is:

1. A transaction processing system comprising one or more transaction processing (TP) subsystems executed on a TP server, a recovery subsystem, executed on a recovery server and one or more resource subsystems executed on one or more resource servers, wherein the TP subsystems are configured to access the one or more resource subsystems, wherein the TP server is not the same server as the recovery server, and
wherein the recovery subsystem is configured to clean up pending transactions created in the transaction processing system, in the event of failures,
wherein the recovery subsystem itself, or a DBMS log that the recovery subsystem is configured to read from and to write to, is configured to receive logging information from the one or more TP subsystems, and to store logging information in transaction log records in a recovery storage;
the recovery subsystem is configured to access the one or more resource subsystems to perform, in the one or more resource subsystems, recovery actions in the event of failures, based on the logging information, and
the recovery subsystem is able to run without any functionality of the one or more TP subsystems being available.

2. The transaction processing system of claim 1, wherein the recovery subsystem is configured to receive, from a TP subsystem,
logging information representing a COMMITTING record, comprising at least one global transaction id or at least one transaction identifier or Xid, each global transaction id or transaction identifier identifying a transaction to be committed in one of the one or more resource subsystems, and
logging information representing a TERMINATED record, the TERMINATED record representing a global transaction id, which identifies a transaction as having been terminated.

3. The transaction processing system of claim 1, wherein the DBMS log is configured to receive, from a TP subsystem,
logging information representing a COMMITTING record, comprising at least one global transaction id or at least one transaction identifier or Xid, each global transaction id or transaction identifier identifying a transaction to be committed in one of the one or more resource subsystems,
and to receive, from the recovery subsystem, at least one of
logging information representing a TERMINATED record, the TERMINATED record representing a global transaction id, which identifies a transaction as having been terminated; and
commands to delete COMMITTING records, identifying them by at least a global transaction id or at least one transaction identifier or Xid.

4. The transaction processing system of claim 1, wherein the recovery subsystem keeps the logging information from the one or more TP subsystems in a shared database that is accessible to more than one independently operable recovery nodes.

5. The transaction processing system of claim 1, wherein the recovery subsystem is configured to receive logging information from more than one TP subsystem.

6. The transaction processing system of claim 1, wherein the recovery subsystem is configured to be triggered to perform recovery actions by a resource subsystem becoming available.

7. The transaction processing system of claim 1, wherein the recovery subsystem is made available as a separate service that is shared between some (or all) TP subsystems in the same transaction recovery domain.

8. The recovery subsystem of claim 2, wherein the recovery subsystem is configured, for each one of one or more resource subsystems, and for a recovery domain corresponding to the recovery subsystem,
to retrieve from the resource subsystem a list of prepared transactions, each of these prepared transactions being identified by a transaction identifier or Xid and belonging to the recovery domain;
to check, for each transaction in the list of prepared transactions, whether the recovery subsystem has in its transaction log records a corresponding COMMITTING record comprising the same Xid;
if there does not exist such a corresponding COMMITTING record, to perform a presumed abort of the transaction with this Xid; or
if there exists such a corresponding COMMITTING record, to perform a replay commit of the transaction with this Xid.

9. The transaction processing system of claim 8, wherein the recovery subsystem is configured, for performing a presumed abort of a transaction with one or more Xids, to
rollback in the resource subsystems the prepared transactions with these one or more Xids; and
if rollback succeeds for all of the one or more Xids, to store, in the transaction log records, a TERMINATED record comprising these Xids.

10. The transaction processing system of claim 8, wherein the recovery subsystem is configured, for performing a replay commit of a transaction with an Xid, to
commit in the resource subsystem the prepared transaction with this Xid; and
if the commit succeeds, to mark, in the transaction log records, the transaction with this Xid as being TERMINATED;
if all transactions of a COMMITTING record are marked as TERMINATED, to mark the COMMITTING record as TERMINATED.

11. The transaction processing system of claim 2, wherein the recovery subsystem is configured, for each one of one or more resource subsystems, and for a recovery domain corresponding to the recovery subsystem, to retrieve from the resource subsystem a list of prepared transactions, each of these prepared transactions being identified by a transaction identifier or Xid and belonging to the recovery domain;

to check, for each Xid in the COMMITTING records in the transaction log records, whether there is, in the list of prepared transactions, a corresponding transaction with this Xid, if there does not exist such a corresponding transaction record, record in the transaction log, the Xid as being TERMINATED, if all transactions of a COMMITTING record are marked as TERMINATED, to mark the COMMITTING record as TERMINATED.

12. The transaction processing system of claim 1, wherein the recovery subsystem is configured, for each one of one or more resource subsystems and for a recovery domain corresponding to the recovery subsystem, to retrieve from the resource subsystem a list of prepared transactions, each of these prepared transactions being identified by a transaction identifier or Xid and belonging to the recovery domain;

to check, for each transaction in the list of prepared transactions, whether the recovery subsystem has in its transaction log records a corresponding COMMITTING record comprising the same Xid;

if there does not exist such a corresponding COMMITTING record, to perform a presumed abort of the transaction with this Xid only if such a corresponding COMMITTING record still does not exist after at least a predetermined time delay.

13. The transaction processing system of claim 1, wherein the recovery subsystem is configured to receive, from a TP subsystem, logging information representing a COMMITTING record, comprising at least one transaction identifier or Xid, each transaction identifier identifying a transaction to be committed in one of the one or more resource subsystems, and a timeout parameter specifying a point in time, and wherein the recovery subsystem is configured, if a current time value representing actual time lies after the point in time specified in the logging information, to reject the COMMITTING record.

14. The transaction processing system of claim 12, wherein the recovery subsystem is configured to receive, from a TP subsystem, logging information representing a COMMITTING record, comprising at least one transaction identifier or Xid, each transaction identifier identifying a transaction to be committed in one of the one or more resource subsystems, and a timeout parameter specifying a point in time, and wherein the recovery subsystem is configured, if a current time value representing actual time lies after the timeout parameter specified in the logging information, to reject the COMMITTING record.

15. The transaction processing system of claim 14, wherein the TP subsystem is configured to retrieve from the recovery subsystem one or more predetermined time delays that are used by the recovery subsystem, and to ensure that they are larger than TP timeout values used by the TP subsystem.

16. The transaction processing system of claim 1, wherein the TP subsystem is configured to verify its resource configurations, including the unique resource names, with the recovery subsystem, to ensure that every resource used by TP is accessible by the recovery subsystem.

17. The recovery subsystem of claim 3, wherein the recovery subsystem is configured, for each one of one or more resource subsystems, and for a recovery domain corresponding to the recovery subsystem, to retrieve from the resource subsystem a list of prepared transactions, each of these prepared transactions being identified by a global transaction id and belonging to the recovery domain;

to check, for each transaction in the list of prepared transactions, whether the recovery subsystem has in its transaction log records a corresponding COMMITTING record comprising the same global transaction id;

if there does not exist such a corresponding COMMITTING record, to perform a presumed abort of the transaction with this global transaction id; or if there exists such a corresponding COMMITTING record, to perform a replay commit of the transaction with this global transaction id.

18. The transaction processing system of claim 17, wherein the recovery subsystem is configured, for performing a presumed abort of a transaction with a global transaction id, to rollback in the resource subsystems the prepared transactions with this global transaction id.

19. The transaction processing system of claim 17, wherein the recovery subsystem is configured, for performing a replay commit of a transaction with a global transaction id, to commit in the resource subsystem all prepared transactions with this global transaction id; and if the commit succeeds for all these prepared transactions, to mark, in the transaction log records, the transaction with this global transaction id as being TERMINATED.

20. The transaction processing system of claim 1, wherein at least one of the one or more TP subsystems is configured to, in the event that it prepares a transaction, publish a TransactionPreparingEvent in a messaging system, for example, an event bus, the TransactionPreparingEvent comprising information identifying at least a global transaction ID and information identifying all resources involved in the transaction, wherein the recovery subsystem is configured to, in the event that it raises an exception, in particular because it is blocked from committing or rolling back a transaction, publish a TransactionHeuristicEvent in the messaging system, the TransactionHeuristicEvent comprising an outcome, and information identifying at least a global transaction ID and information identifying a resource involved in the transaction.

21. The transaction processing system of claim 1, wherein at least one of the one or more TP subsystems is configured to, in the event that it is a child TP subsystem that is called from another, parent TP subsystem, logging a linking record comprising the parent TP subsystem's global transaction ID and child TP subsystem's global transaction ID; and wherein the recovery subsystem is configured to identify a COMMITTING record of the parent TP subsystem, given the child TP subsystem's global transaction ID, by the steps of retrieving the linking record comprising the child TP subsystem's global transaction ID;

determining, from this linking record, the parent TP subsystem's global transaction ID;

determining, from the parent TP subsystem's global transaction ID, the COMMITTING record comprising this global transaction ID.

22. The transaction processing system of claim 21, wherein the recovery subsystem is configured to determine the child TP subsystem's global transaction ID, given a transaction identifier or Xid of the child TP subsystem, by extracting the child TP subsystem's global transaction ID from the Xid of the child TP subsystem.

23. The transaction processing system of claim 1, wherein at least one of the one or more TP subsystems is configured to, when performing, by an invoking transaction, a call to a second TP subsystem, perform the steps of
receiving a return value from the call;
checking whether the return value comprises two-phase commit registration information;
if this is not the case, considering the call as being invalid because the second subsystem was not configured to be transactional, and performing a rollback of the invoking transaction.

24. The transaction processing system of claim 1, wherein at least one of the one or more TP subsystems is configured to, when preparing a transaction and performing a prepare call to a second TP subsystem, include a count of returns received from the second TP subsystem for the same parent transaction;
wherein the second TP subsystem is configured to perform the steps of
when receiving a prepare call, extracting the count of returns received;
comparing this count with the number of returns sent by the second TP system for the same parent transaction;
if this count and the number of returns have different values, rejecting the prepare call.

25. The transaction processing system of claim 1, wherein a DBMS log that the recovery subsystem is configured to read from and to write to, is configured to receive logging information from the one or more TP subsystems, and to store logging information in transaction log records in a recovery storage,
wherein each of the resource subsystems is configured to perform synchronous replication to a respective resource subsystem failover site;
wherein a logging DBMS comprising the DBMS log is configured to perform synchronous replication to a respective logging DBMS failover site.

26. A method for operating an application program calling the transaction system of claim 20, comprising the steps of
the application program receiving, through the messaging system, the TransactionPreparingEvents and the TransactionHeuristicEvents;
the application program logging these events in a log;
the application program logging additional information about its own operation in the log.

27. The method of claim 26, comprising the additional step of
in the event that the recovery subsystem raises an exception, presenting the events and additional information to a human user, in particular by means of a display device.

28. A recovery subsystem,
for cleaning up pending transactions created in a transaction processing system which comprises one or more transaction processing (TP) subsystems configured to access one or more resource subsystems, in the event of failures,
wherein the recovery subsystem itself, or a DBMS log that the recovery subsystem is configured to read from and to write to, is configured to receive logging information from the one or more TP subsystems, and to store logging information in transaction log records;
the recovery subsystem is configured to access the one or more resource subsystems to perform, in the one or more resource subsystems, recovery actions, based on the logging information, and
the recovery subsystem is able to run without any functionality of the one or more TP subsystems being available.

29. The recovery subsystem of claim 28, wherein the recovery subsystem is executed on a recovery server, and the recovery subsystem is configured to
receive logging information from the one or more TP subsystems from a TP server which is not the same server as the recovery server, and to
store logging information in transaction log records in a recovery storage.

30. A method for operating a recovery subsystem in a transaction processing system, wherein the recovery subsystem is arranged to communicate with a transaction processing (TP) subsystem and to communicate with one or more resource subsystems, and wherein
the method comprises
for cleaning up pending transactions created in a transaction processing system, in the event of failures,
the steps of
the recovery subsystem itself, or a DBMS log that the recovery subsystem is configured to read from and to write to, receiving logging information from the one or more TP subsystems, and storing logging information in transaction log records;
the recovery subsystem accessing the one or more resource subsystems and performing, in the one or more resource subsystems, recovery actions in the event of failures, based on the logging information, wherein
the recovery subsystem is able to run without any functionality of the one or more TP subsystems being available.

31. A method for reconstructing log records in the event that log records are not available and given an ordered set of two or more resource subsystems comprising the steps of
a disaster recovery subsystem, for each one of the ordered set of resource subsystems and for a recovery domain corresponding to the recovery subsystem,
retrieving from the resource subsystem a list of prepared transactions, each of these prepared transactions being identified by a transaction identifier or Xid and belonging to the recovery domain, and wherein the Xid is associated with a global transaction ID (GTID);
if, for a particular GTID, an associated Xid is found in a resource subsystem but is not found in the subsequent resource subsystems, then the transactions identified by the GTID are rolled back;
if, for a particular GTID, an associated Xid is found in a resource subsystem but is not found in the preceding resource subsystems, then the transactions identified by the GTID are committed;

if, for a particular GTID, an associated Xid is found in all of the two or more resource subsystems, then all the transactions identified by the GTID can be committed.

* * * * *